(12) United States Patent
Jiang

(10) Patent No.: US 12,531,053 B2
(45) Date of Patent: Jan. 20, 2026

(54) SPEECH RECOGNITION METHOD AND RELATED APPARATUS

(71) Applicant: TENCENT TECHNOLOGY (SHENZHEN) COMPANY LIMITED, Shenzhen (CN)

(72) Inventor: Yongjun Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 162 days.

(21) Appl. No.: 18/441,539

(22) Filed: Feb. 14, 2024

(65) Prior Publication Data

US 2024/0185836 A1 Jun. 6, 2024

Related U.S. Application Data

(63) Continuation of application No. PCT/CN2023/128483, filed on Oct. 31, 2023.

(30) Foreign Application Priority Data

Oct. 31, 2022 (CN) .......................... 202211349643.8

(51) Int. Cl.
*G10L 15/00* (2013.01)
*G10L 15/02* (2006.01)
(Continued)

(52) U.S. Cl.
CPC .............. *G10L 15/02* (2013.01); *G10L 15/16* (2013.01); *G10L 15/22* (2013.01); *G10L 25/30* (2013.01)

(58) Field of Classification Search
CPC ......... G06F 3/16; G06F 16/685; G10L 15/02; G10L 21/0208; G10L 25/78; G10L 15/16;
(Continued)

(56) References Cited

U.S. PATENT DOCUMENTS

2017/0270910 A1 9/2017 Jung
2019/0122099 A1 4/2019 Dung et al.
(Continued)

FOREIGN PATENT DOCUMENTS

CN 109817213 A 5/2019
CN 112542161 A 3/2021

OTHER PUBLICATIONS

The World Intellectual Property Organization (WIPO) International Search Report for PCT/CN2023/128483 Dec. 5, 2023 6 Pages (including translation).

*Primary Examiner* — Vu B Hang
(74) *Attorney, Agent, or Firm* — Anova Law Group, PLLC

(57) ABSTRACT

A speech recognition method includes: inputting a speech into a speech recognition model which includes N hidden layers; predicting speech recognition accuracy corresponding to the $i^{th}$ hidden layer according to the hidden layer information and an accuracy prediction model that are corresponding to the $i^{th}$ hidden layer, the speech recognition accuracy indicating a degree of matching between a speech recognition result determined according to the hidden layer information of the $i^{th}$ hidden layer and an accurate speech recognition result corresponding to the speech; outputting the hidden layer information corresponding to the $i^{th}$ hidden layer to an $(i+1)^{th}$ hidden layer in response to that the speech recognition accuracy does not meet the result output condition; and outputting the hidden layer information corresponding to the $i^{th}$ hidden layer to the output layer in response to that the speech recognition accuracy meets a result output condition, to obtain the speech recognition result.

20 Claims, 6 Drawing Sheets

(51) Int. Cl.
*G10L 15/16* (2006.01)
*G10L 15/22* (2006.01)
*G10L 25/30* (2013.01)

(58) Field of Classification Search
CPC ....... G10L 19/00; G10L 19/005; G10L 25/27;
G10L 25/30; G10L 15/07; G10L 15/20;
G10L 15/22; G10L 15/12; G10L 15/26;
G10L 15/30; G10L 15/063; G10L 25/87;
G10L 15/08; G10L 15/14; G10L 15/1815;
G10L 15/197
See application file for complete search history.

(56) References Cited

U.S. PATENT DOCUMENTS

2021/0020167 A1  1/2021  Kwon et al.
2021/0233521 A1  7/2021  Su et al.

SPEECH RECOGNITION METHOD AND RELATED APPARATUS

CROSS-REFERENCES TO RELATED APPLICATIONS

This application is a continuation application of PCT Patent Application No. PCT/CN2023/128483, filed on Oct. 31, 2023, which claims priority to Chinese Patent Application No. 202211349643.8, entitled "SPEECH RECOGNITION METHOD AND RELATED APPARATUS" filed with the National Intellectual Property Administration, PRC on Oct. 31, 2022, both of which are incorporated herein by reference in their entirety.

FIELD OF THE TECHNOLOGY

The present disclosure relates to the field of information processing technologies, and in particular, to speech recognition.

BACKGROUND

Speech recognition refers to recognition of text content in a speech, and has a wide range of application scenarios in a plurality of technical fields. Because the application of speech recognition is mainly the application of speech recognition results, whether the text obtained through speech recognition is accurate directly determines the performance of the speech recognition application.

To improve the speech recognition accuracy, a model training technology is usually used to obtain a speech recognition model, and a speech recognition result corresponding to an inputted speech is obtained through cooperative processing of model parts included in the speech recognition model.

However, the recognition difficulty for different speeches may be different. During speech recognition performed through the speech recognition model, the recognition difficulty of the speech may not be analyzed, resulting in that each speech recognition process requires participation of all the model parts in the speech recognition model, causing relatively low speech recognition efficiency.

SUMMARY

To resolve the foregoing technical problems, the present disclosure provides a speech recognition method, which improves the speech recognition efficiency while ensuring the speech recognition accuracy.

In the embodiments of the present disclosure, the following technical solutions are disclosed:

According to a first aspect, an embodiment of the present disclosure discloses a speech recognition method. The method includes: acquiring a speech; inputting the speech into a speech recognition model, the speech recognition model including an input layer, an output layer, and N hidden layers, the input layer being configured to extract an audio feature corresponding to the speech and output the audio feature to a first hidden layer, an $i^{th}$ hidden layer being configured to calculate hidden layer information corresponding to the $i^{th}$ hidden layer based on hidden layer information outputted by a previous layer, and the output layer being configured to determine a speech recognition result corresponding to the speech according to hidden layer information outputted by a hidden layer, N being a positive integer greater than 1, and i being a positive integer not greater than N−1; predicting speech recognition accuracy corresponding to the $i^{th}$ hidden layer according to the hidden layer information and an accuracy prediction model that are corresponding to the $i^{th}$ hidden layer, the speech recognition accuracy being configured for identifying a degree of matching between a speech recognition result determined according to the hidden layer information of the $i^{th}$ hidden layer and an accurate speech recognition result corresponding to the speech; outputting the hidden layer information corresponding to the $i^{th}$ hidden layer to an $(i+1)^{th}$ hidden layer when the speech recognition accuracy does not meet the result output condition; and outputting the hidden layer information corresponding to the $i^{th}$ hidden layer to the output layer when the speech recognition accuracy meets a result output condition, to obtain the speech recognition result corresponding to the speech.

According to a second aspect, an embodiment of the present disclosure discloses a speech recognition apparatus. The apparatus includes a first acquisition unit, an input unit, a prediction unit, a first response unit, and a second response unit, the first acquisition unit being configured to acquire a speech; the input unit being configured to input the speech into a speech recognition model, the speech recognition model including an input layer, an output layer, and N hidden layers, the input layer being configured to extract an audio feature corresponding to the speech and output the audio feature to a first hidden layer, an $i^{th}$ hidden layer being configured to calculate hidden layer information corresponding to the $i^{th}$ hidden layer based on hidden layer information outputted by a previous layer, and the output layer being configured to determine a speech recognition result corresponding to the speech according to hidden layer information outputted by a hidden layer, N being a positive integer greater than 1, and i being a positive integer not greater than N−1; the prediction unit being configured to predict speech recognition accuracy corresponding to the $i^{th}$ hidden layer according to the hidden layer information and an accuracy prediction model that are corresponding to the $i^{th}$ hidden layer, the speech recognition accuracy being configured for identifying a degree of matching between a speech recognition result determined according to the hidden layer information of the $i^{th}$ hidden layer and an accurate speech recognition result corresponding to the speech; the first response unit being configured to output the hidden layer information corresponding to the $i^{th}$ hidden layer to the output layer when the speech recognition accuracy meets a result output condition, to obtain the speech recognition result corresponding to the speech; and the second response unit being configured to output the hidden layer information corresponding to the $i^{th}$ hidden layer to an $(i+1)^{th}$ hidden layer when the speech recognition accuracy does not meet the result output condition.

According to a third aspect, an embodiment of the present disclosure discloses a computer device, including at least one processor and at least one memory; the at least one memory being configured to store a computer program, and transmit the computer program to the at least one processor; and the at least one processor being configured to perform the speech recognition method in the first aspect according to the computer program.

According to a fourth aspect, an embodiment of the present disclosure discloses a non-transitory computer-readable storage medium, configured to store a computer program, the computer program being configured to perform the speech recognition method in the first aspect.

It can be seen from the foregoing technical solutions that the speech recognition model in the present disclosure includes N hidden layers for iterative calculation. Because each hidden layer performs further calculation based on an output of a previous layer, a later hidden layer in the iterative calculation usually has a stronger speech recognition capability. During speech recognition, the speech recognition is not necessarily performed based on all hidden layers in the speech recognition model in the present disclosure. Instead, in the process of iterative calculation, corresponding speech recognition accuracy is predicted through an accuracy prediction model according to hidden layer information outputted by each hidden layer that performs calculation. If speech recognition accuracy corresponding to an $i^{th}$ hidden layer already meets a result output condition, it indicates that information calculated by the hidden layer already sufficiently fits actual text corresponding to the speech, so that a speech recognition result is directly outputted based on the hidden layer information of the $i^{th}$ hidden layer, and subsequent iterative calculation is no longer performed through subsequent hidden layers; and if the speech recognition accuracy does not meet the result output condition, the hidden layer information corresponding to the $i^{th}$ hidden layer is outputted to an $(i+1)^{th}$ hidden layer for subsequent iterative calculation, to improve the recognition accuracy. Therefore, for a speech with relatively low recognition difficulty, an accurate speech recognition result can be outputted through iterative calculation of a relatively small quantity of hidden layers, and it is unnecessary to wait for iterative calculation of a plurality of subsequent hidden layers; and for a speech with relatively high recognition difficulty, iterative calculation may be performed through a relatively large quantity of hidden layers, thereby ensuring the accuracy of a recognition result. It can be seen from above that, in the present disclosure, the quantity of hidden layers participating in the calculation may be dynamically adjusted based on the recognition accuracy, which improves the overall speech recognition efficiency while ensuring the speech recognition accuracy.

DESCRIPTION OF EMBODIMENTS

Figure 1:
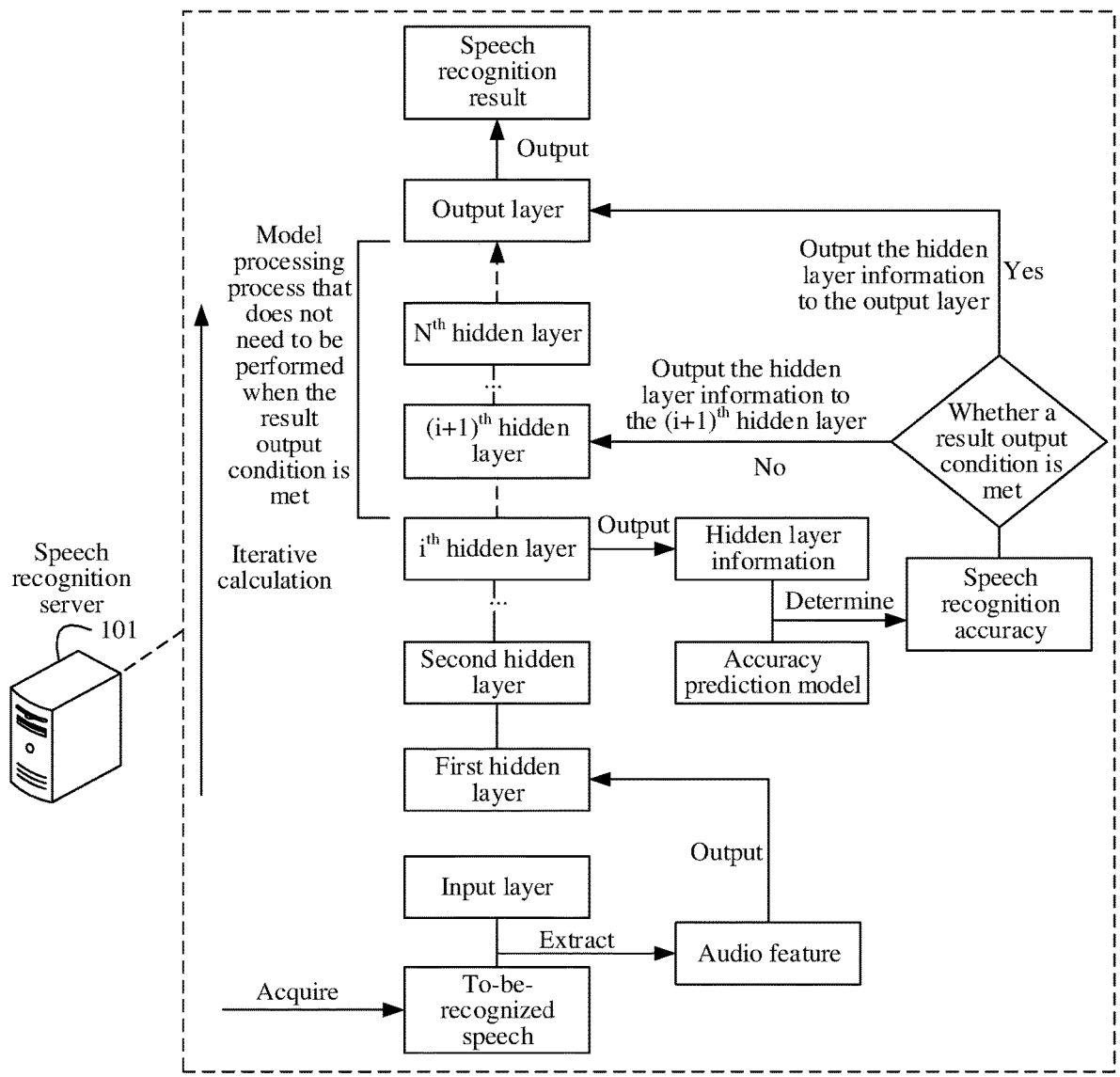
FIG. 1 is a schematic diagram of a speech recognition method in an actual application scenario according to an embodiment of the present disclosure.

The following describes the embodiments of the present disclosure with reference to the accompanying drawings.

A speech recognition model configured to perform speech recognition usually includes an input layer, an output layer, and a plurality of hidden layers. In During speech recognition, feature extraction is performed on a speech through the input layer, then iterative calculation is performed on an extracted audio feature through the plurality of hidden layers, and the output layer determines a speech recognition result corresponding to the speech based on hidden layer information outputted by the last hidden layer. However, different speeches may have different recognition difficulty. For example, for speeches recorded in a clean environment, consistent with a reading style, and having clear pronunciation and articulation and a normal speaking speed, relatively good recognition effects can be achieved based on existing speech recognition models, and the accuracy can even be close to 100%; but for speeches recorded in a noisy environment, and having a free pronunciation style, unclear articulation or even severe accents, and an excessively high speaking speed, the recognition effects are usually poor, and the recognition difficulty is relatively high. For the former, relatively good recognition effects can be achieved by using speech recognition models with a relatively weak speech recognition capability, while for the latter, speech recognition models with a relatively strong speech recognition capability are required to achieve desirable effects.

In some speech recognition method, there is no distinction between speech recognition difficulty of speeches. For any speech, a speech recognition result is obtained by performing iterative calculation through all hidden layers. However, because a next hidden layer performs iterative calculation based on an output of a previous layer, hidden layer information outputted by a later hidden layer in the iterative calculation is usually closer to the accurate recognition result corresponding to the speech, that is, a speech recognition capability of a later hidden layer is stronger. Therefore, when the recognition difficulty of the speech is relatively low, a relatively accurate speech recognition result can be outputted through relatively previous hidden layers. However, when there is no distinction in recognition difficulty, a speech recognition result can only be outputted through complete iterative calculation, resulting in low speech recognition efficiency.

To resolve the foregoing technical problems, the present disclosure provides a speech recognition method. During recognition performed on a speech through a speech recognition model, speech recognition accuracy corresponding to a hidden layer participating in iterative calculation is predicted through an accuracy prediction model. If speech recognition accuracy of an $i^{th}$ hidden layer for the speech meets a result output condition, it indicates that the hidden layer already has a sufficient speech recognition capability for the speech, and a processing device can output a relatively accurate speech recognition result without performing iterative calculation of subsequent hidden layers, thereby improving the speech recognition efficiency.

It may be understood that, the method may be applied to a processing device. The processing device is a processing device that can perform speech recognition. For example, the processing device may be a terminal device or a server with a speech recognition function. The method may be performed independently by a terminal device or a server, or may be applied to a network scenario in which a terminal device communicates with a server, and performed by the terminal device and the server in cooperation. The terminal device may be a device such as a computer or a mobile phone. The server may be understood as an application server, or may be a Web server. During actual deployment, the server may be an independent server, or may be a cluster server.

For ease of understanding of the technical solutions provided in the embodiments of the present disclosure, a speech recognition method provided in the embodiments of the present disclosure is described below with reference to an actual application scenario.

FIG. 1 is a schematic diagram of a speech recognition method in an actual application scenario according to an embodiment of the present disclosure. In this actual application scenario, the processing device is a speech recognition server 101 with a speech recognition function.

After acquiring a speech, the speech recognition server 101 inputs the speech into an input layer of a speech recognition model. The input layer extracts an audio feature corresponding to the speech and outputs the audio feature to a first hidden layer. The first hidden layer to the $N^{th}$ hidden layer are responsible for performing iterative calculation.

When iterative calculation is performed to an $i^{th}$ hidden layer, the speech recognition server 101 predicts speech recognition accuracy corresponding to the $i^{th}$ hidden layer through an accuracy prediction model according to hidden layer information calculated by the $i^{th}$ hidden layer, the speech recognition accuracy being configured for identifying a degree of matching between a speech recognition result determined according to the hidden layer information and an accurate speech recognition result corresponding to the speech. The speech recognition server 101 may preset a result output condition, for example, set the result output condition as that the accuracy is greater than a certain threshold.

When the speech recognition accuracy meets the result output condition, it indicates that a relatively accurate speech recognition result can be already determined based on the hidden layer information. In this case, the hidden layer information may be directly outputted to the output layer to obtain the speech recognition result corresponding to the speech, so that iterative calculation of a plurality of subsequent hidden layers is not required, thereby improving the speech recognition efficiency. If the speech recognition accuracy does not meet the result output condition, it indicates that when the iterative calculation is performed to the $i^{th}$ hidden layer, the calculated hidden layer information cannot be used to accurately recognize the speech. In this case, the hidden layer information calculated by the $i^{th}$ hidden layer may be outputted to an $(i+1)^{th}$ hidden layer for iterative calculation of a next layer, thereby improving the speech recognition accuracy.

It can be seen from above that, in the present disclosure, a speech recognition result can be directly outputted when an output of a hidden layer meets a speech recognition accuracy requirement, which saves time required for subsequent iterative calculation. Therefore, when the recognition difficulty of the speech is relatively low, a speech recognition result can be outputted relatively quickly; and when the recognition difficulty of the speech is relatively high, the speech recognition accuracy can be ensured through iterative calculation of a relatively large quantity of hidden layers, thereby improving the speech recognition efficiency while ensuring the speech recognition accuracy.

A speech recognition method provided in the embodiments of the present disclosure is described below with reference to the accompanying drawings.

Figure 2:
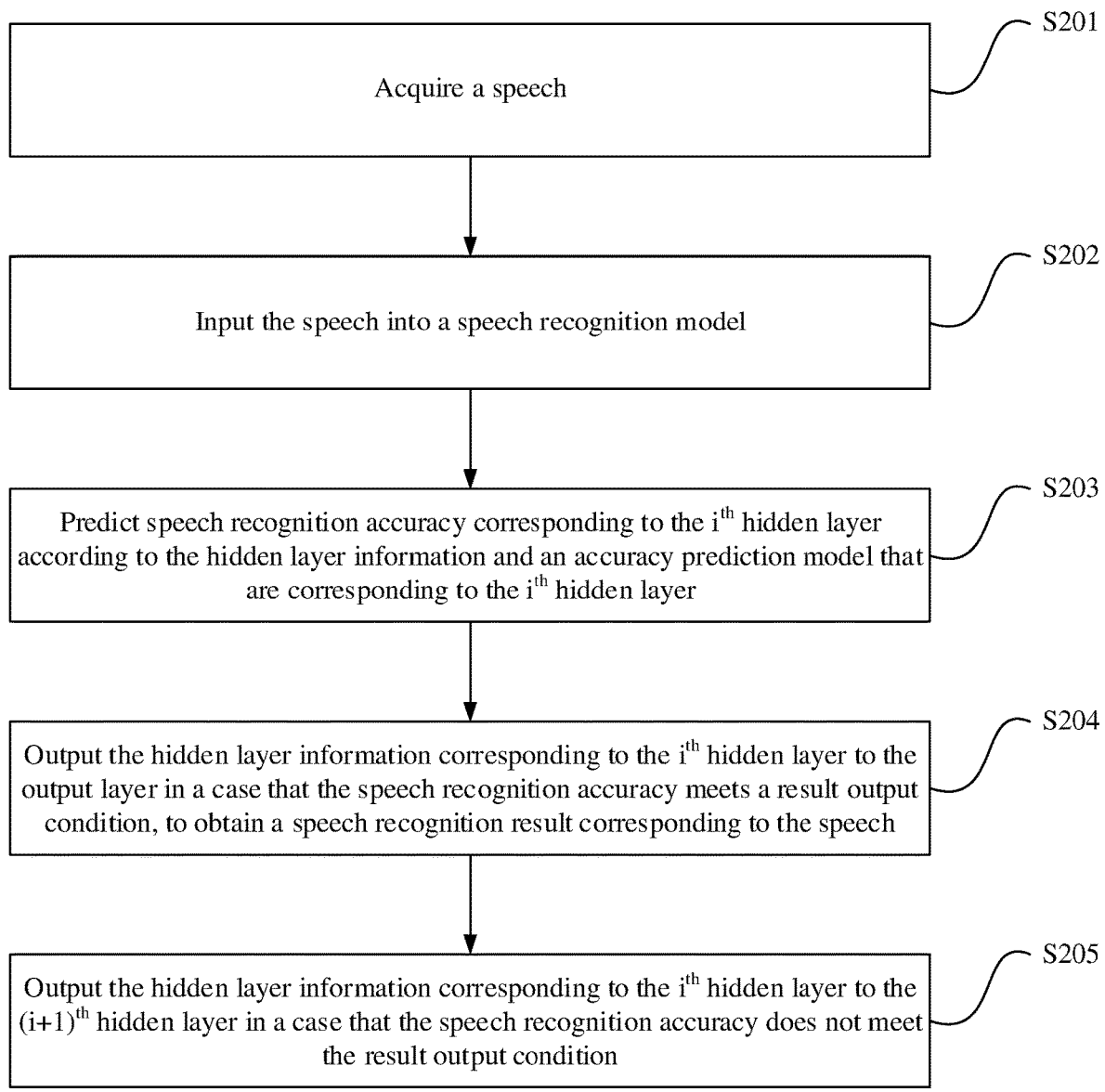
FIG. 2 is a flowchart of a speech recognition method according to an embodiment of the present disclosure.

FIG. 2 is a flowchart of a speech recognition method according to an embodiment of the present disclosure. The method includes the following steps:

S201: Acquire a speech.

The speech may be any speech on which speech recognition needs to be performed, such as a conference recording or an audio corresponding to a video. Based on a different processing device, a manner in which the processing device acquires a speech may also be different. For example, when the processing device is a terminal device, a speech inputted into the terminal device may be acquired directly; when the processing device is a server, a speech transmitted through another terminal device or server may be acquired; or when the processing device is a combination of a terminal device and a server, a speech may be acquired through the terminal device and then transmitted to the server for subsequent processing.

S202: Input the speech into a speech recognition model.

In the present disclosure, the speech recognition model includes an input layer, an output layer, and N hidden layers. The input layer is configured to extract an audio feature corresponding to the speech and output the audio feature to a first hidden layer. The N hidden layers are configured to perform iterative calculation on the audio feature, to extract information useful for speech recognition.

In this embodiment of the present disclosure, the iterative calculation refers to a calculation process in which the N hidden layers sequentially perform calculation based on hidden layer information outputted by a previous hidden layer, and transmit calculated hidden layer information of the current layer to a next hidden layer. For example, the $i^{th}$ hidden layer is configured to calculate the hidden layer information corresponding to the $i^{th}$ hidden layer based on the hidden layer information outputted by the previous layer, then the hidden layer information of the $i^{th}$ hidden layer is used as an output of the $i^{th}$ hidden layer, and an $(i+1)^{th}$ hidden layer is configured to calculate the hidden layer information corresponding to the $(i+1)^{th}$ hidden layer based on the output of the $i^{th}$ hidden layer. The rest can be deduced by analogy.

In this calculation process, the $i^{th}$ hidden layer may perform calculation on the output of the previous layer based on its hidden layer parameters, thereby highlighting an information part that is quite helpful for the speech recognition and reducing the degree of influence of an information part that interferes with the speech recognition. The input of the first hidden layer is the audio feature outputted by the input layer. N is a positive integer greater than 1, and i is a positive integer not greater than N−1.

Because each hidden layer performs calculation based on an output of a previous layer, as hidden layers participating in the iterative calculation increase, the calculation accuracy for information in the audio feature is usually higher, that is, hidden layer information calculated by a later hidden layer in the iterative calculation matches the accurate speech recognition result corresponding to the speech with a higher degree.

The output layer is configured to determine a speech recognition result corresponding to the speech based on an output of a hidden layer. For example, usually, although hidden layer information calculated by a hidden layer can be used to determine a speech recognition result, the information is relatively complex, and the speech recognition result for the speech cannot be intuitively reflected. The function of the output layer is to transform hidden layer information into a dimension in which a recognition result can be intuitively reflected, to determine the speech recognition result corresponding to the speech. For example, the hidden layer information may include parameters respectively corresponding to W nodes in the hidden layer, and the dimension configured for reflecting the recognition result is a Chinese character dimension of six thousand common Chinese characters. The W parameters can be transformed into an output vector with six thousand parameter nodes based on relevant parameters in the output layer. A parameter on each parameter node is configured for identifying a degree of matching with a Chinese character corresponding to the node. Therefore, the output layer can determine Chinese characters corresponding to the speech based on the output vector. In addition to the Chinese character dimension, there may also be a phoneme dimension, a triphone dimension, a letter dimension, a subword dimension, a word dimension, and the like, which is not limited herein.

As mentioned above, the recognition difficulty of different speeches is different. In an actual speech recognition process, accurate speech recognition can already be performed on a speech with a relatively low recognition difficulty through relatively previous hidden layers, and it is difficult for iterative calculation of subsequent hidden layers to improve the speech recognition accuracy. When there is no targeted speech recognition for speeches with different recognition difficulty, even if the speech recognition difficulty is relatively low, iterative calculation of all hidden layers is required to output the speech recognition result, resulting in low speech recognition efficiency.

S203: Predict speech recognition accuracy corresponding to the $i^{th}$ hidden layer according to the hidden layer information and an accuracy prediction model that are corresponding to the $i^{th}$ hidden layer.

To resolve the technical problem of low speech recognition efficiency, in the present disclosure, an accuracy prediction model is added. The accuracy prediction model may be a part of the speech recognition model or an independent model. The accuracy prediction model is configured to predict, based on hidden layer information calculated by a hidden layer, speech recognition accuracy of a speech recognition result determined according to the hidden layer information, the speech recognition accuracy being configured for identifying a degree of matching between a speech recognition result determined according to the hidden layer information of the $i^{th}$ hidden layer and an accurate speech recognition result corresponding to the speech.

Through this accuracy prediction model, the processing device can learn speech recognition accuracy corresponding to each hidden layer participating in the iterative calculation in the iterative calculation process, that is, a degree of matching between hidden layer information calculated by each hidden layer and the accurate speech recognition result. Therefore, when speech recognition accuracy corresponding to a certain hidden layer is sufficiently high, it indicates that accurate speech recognition can be already performed on the speech through iterative calculation to the hidden layer, and it is unnecessary to perform iterative calculation of subsequent hidden layers.

S204: Output the hidden layer information corresponding to the $i^{th}$ hidden layer to the output layer when the speech recognition accuracy meets a result output condition, to obtain a speech recognition result corresponding to the speech.

The processing device may preset a result output condition. The result output condition is configured for determining whether the speech recognition accuracy corresponding to the $i^{th}$ hidden layer meets a speech recognition accuracy requirement.

If the speech recognition accuracy corresponding to the $i^{th}$ hidden layer already meets the result output condition, it indicates that a relatively accurate speech recognition result can be already determined according to the hidden layer information of the $i^{th}$ hidden layer. In this case, the processing device may not perform iterative calculation of subsequent N−i hidden layers, and directly output the hidden layer information of the $i^{th}$ hidden layer to the output layer, so that the output layer determines the speech recognition result corresponding to the speech based on the hidden layer information in the manner introduced above. Therefore, for some speeches with relatively low recognition difficulty, relatively accurate speech recognition results can be obtained through iterative calculation of relatively previous hidden layers without complete iterative calculation, which improves the speech recognition efficiency while ensuring the accuracy.

S205: Output the hidden layer information corresponding to the $i^{th}$ hidden layer to the $(i+1)^{th}$ hidden layer when the speech recognition accuracy does not meet the result output condition.

If the speech recognition accuracy does not meet the result output condition, it indicates that the speech recognition accuracy corresponding to the $i^{th}$ hidden layer does not meet the speech recognition accuracy requirement, and a relatively accurate speech recognition result cannot be directly determined based on the hidden layer information of the hidden layer. In this case, the processing device may output the hidden layer information to the $(i+1)^{th}$ hidden layer and perform subsequent iterative calculation to improve the degree of matching between the hidden layer information and the accurate speech recognition result, thereby ensuring that when the recognition difficulty of the speech is relatively high, the processing device can also perform relatively accurate speech recognition on the speech.

For the $(i+1)^{th}$ hidden layer, the processing device may adopt a manner the same as that for the $i^{th}$ hidden layer. Through determining in the foregoing manner, the speech recognition result can be determined directly based on the hidden layer information of the $(i+1)^{th}$ hidden layer. The rest can be deduced by analogy, until the $N^{th}$ hidden layer completes iterative calculation.

It can be seen from the foregoing technical solutions that the speech recognition model in the present disclosure includes N hidden layers for iterative calculation. Because each hidden layer performs further calculation based on an output of a previous layer, a later hidden layer in the iterative calculation usually has a stronger speech recognition capability. During speech recognition, the speech recognition is not necessarily performed based on all hidden layers in the speech recognition model in the present disclosure. Instead, in the process of iterative calculation, corresponding speech recognition accuracy is predicted through an accuracy prediction model according to hidden layer information outputted by each hidden layer that performs calculation. If speech recognition accuracy corresponding to an $i^{th}$ hidden layer already meets a result output condition, it indicates that information calculated by the hidden layer already sufficiently fits actual text corresponding to the speech, so that a speech recognition result is directly outputted based on the hidden layer information of the $i^{th}$ hidden layer, and subsequent iterative calculation is no longer performed through subsequent hidden layers; and if the speech recognition accuracy does not meet the result output condition, the hidden layer information corresponding to the $i^{th}$ hidden layer is outputted to an $(i+1)^{th}$ hidden layer for subsequent iterative calculation, to improve the recognition accuracy. Therefore, for a speech with relatively low recognition difficulty, an accurate speech recognition result can be outputted through iterative calculation of a relatively small quantity of hidden layers, and it is unnecessary to wait for iterative calculation of a plurality of subsequent hidden layers; and for a speech with relatively high recognition difficulty, iterative calculation may be performed through a relatively large quantity of hidden layers, thereby ensuring the accuracy of a recognition result. It can be seen from above that, in the present disclosure, the quantity of hidden layers participating in the calculation may be dynamically adjusted based on the recognition accuracy, which improves the overall speech recognition efficiency while ensuring the speech recognition accuracy.

How to obtain the speech recognition model and the accuracy prediction model through training will be introduced below in detail.

In one embodiment, the processing device may acquire an initial speech recognition model, an initial accuracy prediction model, and a first sample speech set, the initial speech recognition model including an initial input layer, an initial output layer, and N initial hidden layers, and the first sample speech set including a plurality of first sample speeches, the first sample speeches having corresponding sample recognition results, the sample recognition results being accurate speech recognition results corresponding to the first sample speeches.

The processing device may use each of the plurality of first sample speeches as a first target sample speech. For the first target sample speech, the processing device extracts a first audio feature corresponding to the first target sample speech and outputs the first audio feature to a first initial hidden layer through the initial output layer. The processing device performs iterative calculation on the first audio feature through the N initial hidden layers, an $i^{th}$ initial hidden layer being configured to calculate hidden layer information corresponding to the $i^{th}$ initial hidden layer based on an output of a previous layer, and output the hidden layer information corresponding to the $i^{th}$ initial hidden layer to an $(i+1)^{th}$ initial hidden layer;

Because the hidden layer information of each hidden layer in the present disclosure may be used as a basis for directly determining the speech recognition result, in the present disclosure, the hidden layer information calculated by each hidden layer first needs to have the capability for use for determining a speech recognition result as much as possible. The processing device may determine first pending recognition results respectively corresponding to the N initial hidden layers according to hidden layer information respectively corresponding to the N initial hidden layers through the initial output layer. The first pending recognition results are speech recognition results respectively determined through iterative calculation of the initial hidden layers.

To enable the speech recognition model to have the capability to accurately perform speech recognition, the processing device may determine a first loss function based on a difference between the first pending recognition results respectively corresponding to the N initial hidden layers and the sample recognition result corresponding to the first target sample speech. A smaller first loss function indicates that the first pending recognition results determined by the N initial hidden layers are overall closer to the accurate recognition result of the first target sample speech, and the overall recognition accuracy of the initial speech recognition model is higher. In the present disclosure, the first loss function is determined based on the speech recognition results respectively corresponding to the N initial hidden layers, and the first loss function is equivalent to a sum of loss functions respectively corresponding to the N hidden layers, so that when parameter adjustment is performed based on the first loss function, a hidden layer information calculating capability of each initial hidden layer can be trained, so that each initial hidden layer has a certain speech recognition capability. Certainly, to improve training efficiency, the processing device may also refer to other suitable model training manner, determine a unique first pending recognition result corresponding to the initial speech recognition model only based on the hidden layer information outputted by the $N^{th}$ initial hidden layer of the model, and then determine a first loss function based on a difference between the first pending recognition result and the sample recognition result corresponding to the first target sample speech. Based on the first loss function, the speech recognition capability of the model can be overall improved, but relatively detailed adjustment cannot be performed for each initial hidden layer, so that each initial hidden layer having a relatively stable speech recognition capability cannot be ensured.

As mentioned above, the accuracy prediction model performs accuracy prediction based on hidden layer information. Therefore, during model training, the processing device needs to enable the accuracy prediction model to have the accuracy prediction capability. The processing device may determine sample speech recognition accuracy respectively corresponding to the N initial hidden layers according to the differences between the first pending recognition results respectively corresponding to the N initial hidden layers and the sample recognition result corresponding to the first target sample speech. The sample speech recognition accuracy is the real speech recognition accuracy corresponding to initial hidden layer information.

Subsequently, the processing device may determine pending speech recognition accuracy respectively corresponding to the N initial hidden layers according to the initial accuracy prediction model and the hidden layer information respectively corresponding to the N initial hidden layer. The pending speech recognition accuracy is speech recognition accuracy predicted by the initial accuracy prediction model according to the hidden layer information respectively corresponding to the N initial hidden layers. The processing device may determine a second loss function according to differences between the pending speech recognition accuracy and the sample speech recognition accuracy that are respectively corresponding to the N initial hidden layers, and then perform parameter adjustment on the initial speech recognition model and the initial accuracy prediction model according to the first loss function and the second loss function, to obtain the speech recognition model and the accuracy prediction model.

During adjustment according to the first loss function, each component of the initial speech recognition model can learn how to perform accurate speech recognition on the speech, so that the audio feature extracted by the output layer can highlight reflection of the speech content in a better way, thereby reducing interference of interference factors; each hidden layer can effectively perform further iterative calculation on an output of a previous layer, thereby highlighting the information that is helpful for speech recognition; the output layer can perform more accurate information processing on hidden layer information outputted by a hidden layer, thereby obtaining a speech recognition result fitting the hidden layer information. During adjustment according to the second loss function, the initial accuracy prediction model can learn how to perform accurate speech recognition accuracy prediction based on hidden layer information. The initial accuracy prediction model may analyze the credibility of the speech recognition results reflected in the hidden layer information based on the text correlation characteristics of the speech recognition result reflected in the hidden layer information, and then determine the speech recognition accuracy corresponding to the hidden layer information. In addition, based on the second loss function, the model components in the initial speech recognition model can learn how to make the determined hidden layer information more helpful for prediction of speech recognition accuracy. For example, the processing device may perform parameter adjustment on the initial input layer and the initial hidden layer in combination with the first loss function and the second loss function, so that an audio feature extracted by the initial input layer and hidden layer information calculated by the initial hidden layer can be more applicable to prediction of speech recognition accuracy on the hidden layer information when being capable of being used for performing accurate recognition on the speech.

Figure 3:
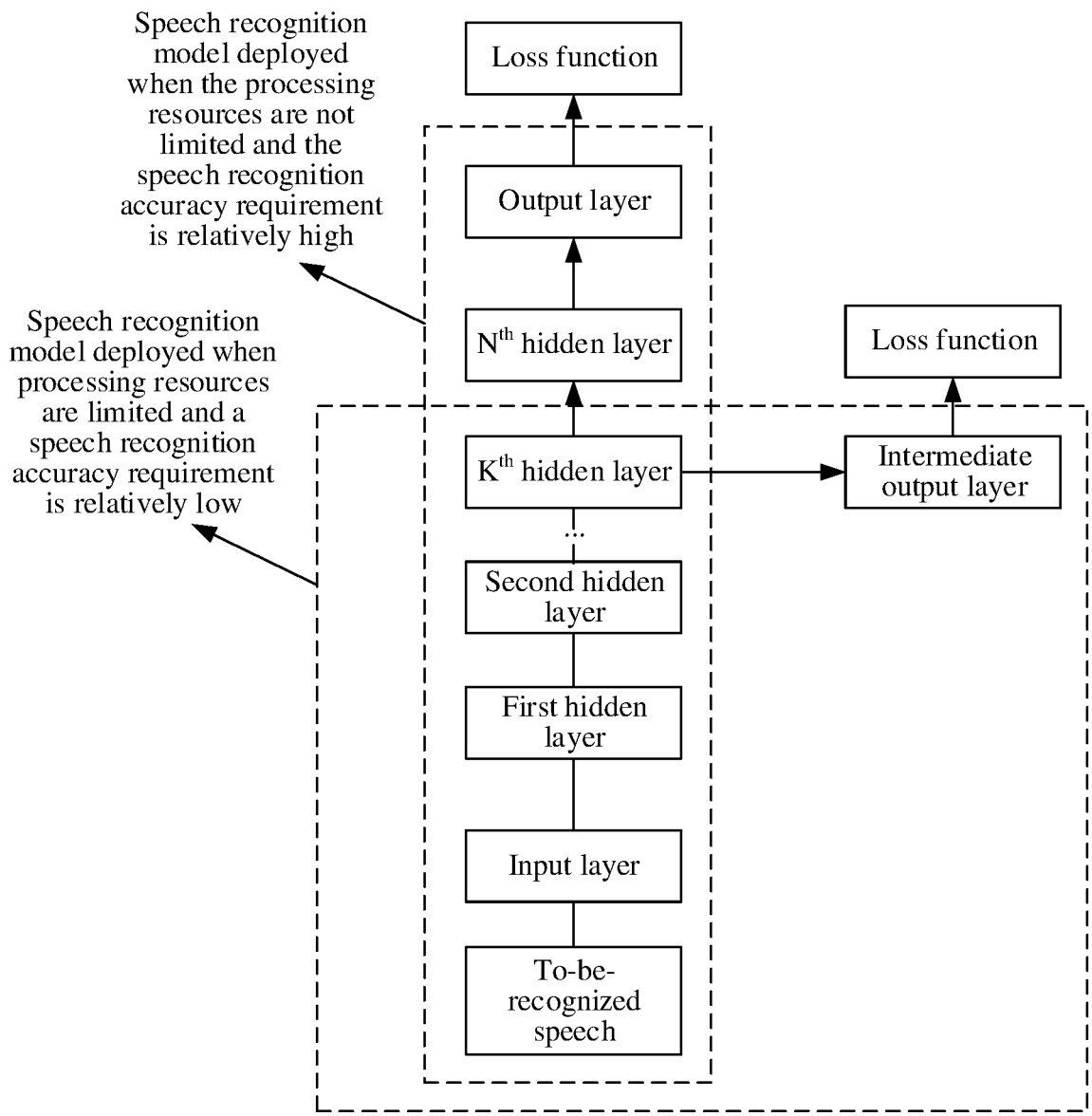
FIG. 3 is a schematic diagram of a speech recognition method according to an embodiment of the present disclosure.

There are also methods for achieving different accuracy of speech recognition through speech recognition models with different quantities of hidden layers. As shown in FIG. 3, the speech recognition model has N hidden layers, and a $K^{th}$ hidden layer is a hidden layer located in the middle. During model training, an output layer is set for each of the $K^{th}$ hidden layer and the $N^{th}$ hidden layer. During training, parameter adjustment is performed based on loss functions respectively corresponding to the two output layers. Therefore, during application, speech recognition may be performed through a speech recognition model formed by the first K hidden layers and the intermediate output layer, or speech recognition may be performed through a speech recognition model formed by the complete N hidden layers and output layers. Therefore, when processing resources are not limited and relatively sufficient, and a speech recognition accuracy requirement is relatively high, the latter speech recognition model may be deployed; and when the processing resources are limited and the speech recognition accuracy requirement is relatively low, the former speech recognition model may be deployed. However, after the model is deployed, a speech recognition result can only be outputted through iterative calculation of all hidden layers included in the deployed model. Therefore, the foregoing problem of relatively low speech recognition efficiency still exists.

It can be seen from the foregoing training content that the second loss function is formed based on the speech recognition result determined by the initial output layer. Therefore, the accuracy of the second loss function depends on the initial output layer's accurate analysis on the hidden layer information to a certain extent, to determine the real speech recognition result corresponding to the hidden layer information.

Based on this, in one embodiment, to further improve the accuracy of model training, the processing device may pre-train a hidden layer information analysis capability of the output layer, giving priority to ensuring that the output layer can determine a speech recognition result matching the hidden layer information, thereby ensuring the effectiveness the sample speech recognition accuracy.

The processing device may acquire a pending speech recognition model and a second sample speech set, the pending speech recognition model also including a pending input layer, a pending output layer, and N pending hidden layers, the second sample speech set including a plurality of second sample speeches, the second sample speeches having corresponding sample recognition results, the sample recognition results being accurate speech recognition results corresponding to the second sample speeches.

Similar to the foregoing training process, the processing device may use each of the plurality of second sample speeches as a second target sample speech, extract a second audio feature corresponding to the second target sample speech and output the second audio feature to a first pending hidden layer through the pending output layer, and then perform iterative calculation on the second audio feature through the N pending hidden layers, an $i^{th}$ pending hidden layer being configured to calculate hidden layer information corresponding to the $i^{th}$ pending hidden layer based on an output of a previous layer, and output the hidden layer information corresponding to the $i^{th}$ pending hidden layer to an $(i+1)^{th}$ pending hidden layer.

The processing device may determine second pending recognition results respectively corresponding to the N pending hidden layers according to hidden layer information respectively corresponding to the N pending hidden layers through the pending output layer, the second pending recognition results being pending recognition results determined by the pending output layer. Because the sample recognition result corresponding to the second target sample speech is an accurate speech recognition result, the processing device may determine a third loss function according to differences between the second pending recognition results respectively corresponding to the N pending hidden layers and a sample recognition result corresponding to the second target sample speech.

The processing device may perform parameter adjustment on the pending speech recognition model by using the third loss function to obtain an initial speech recognition model. During the parameter adjustment, by reducing the third loss function, the pending speech recognition model can learn how to accurately recognize the speech, so that the pending input layer thereof can learn how to extract an audio feature that is helpful for speech recognition from the speech, the pending hidden layer can learn how to highlight, through iterative calculation, the information part in the audio feature that can express an speech recognition result, and the pending output layer can learn how to perform accurate information analysis on the hidden layer information. Because the initial output layer in the initial speech recognition model can already accurately analyze the speech recognition results corresponding to the hidden layer information, the determined sample speech recognition accuracy is also sufficiently accurate, so that the second loss function can be used to perform more accurate model training.

Because the output layer is only responsible for determining a speech recognition result based on hidden layer information and is not involved in the training process of the hidden layer information, the output layer is not affected by the second loss function. Through the foregoing training process, the initial output layer already has a capability to relatively accurately analyze the hidden layer information. Therefore, during actual parameter adjustment, the processing device may directly determine the initial output layer as an output layer, and no more further parameter adjustment is performed, to improve the model training efficiency.

In addition, the processing device may perform parameter adjustment on the N initial hidden layers and the initial input layer according to the first loss function and the second loss function, to obtain the N hidden layers and the input layer, thereby obtaining the speech recognition model. That is, the parameter adjustment of the initial input layer and the initial hidden layers is affected by both the first loss function and the second loss function. The objective of adjustment by using the first loss function is to ensure the accuracy of speech recognition in the parameter adjustment process. The objective of adjustment by using the second loss function is to enable the initial input layer to learn how to make the extracted audio feature be helpful for the analysis of speech recognition accuracy on the hidden layer information, and to enable the initial hidden layers to learn how to make the hidden layer information obtained through iterative calculation be helpful for analysis of speech recognition accuracy on the hidden layer information. The accuracy prediction model only needs to focus on whether analysis of speech recognition accuracy can be accurately performed on the hidden layer information. Therefore, the processing device may perform parameter adjustment on the initial accuracy prediction model according to the second loss function to obtain the accuracy prediction model. That is, the parameter adjustment of the initial accuracy prediction model is only affected by the second loss function.

It should be emphasized that only in the process of model training, the accuracy prediction model needs to determine the sample speech recognition accuracy based on the speech recognition result corresponding to the hidden layer information, and when the training is completed, the accuracy prediction model already has a capability to directly predict speech recognition accuracy based on the hidden layer information. Therefore, during application, before the speech recognition result is outputted, the speech recognition accuracy can be predicted without determining of the speech recognition results through the output layer.

It may be understood that, because each hidden layer performs calculation based on an output of a previous layer, characteristics of hidden layer information outputted by each hidden layer may also be different. In one embodiment, to further improve the accuracy of the output layer's analysis on the hidden layer information, the initial output layer may include N initial output layers. The N initial output layers have a one-to-one correspondence with the N initial hidden layers. Each output layer is configured to determine a speech recognition result according to hidden layer information outputted by a hidden layer corresponding to the output layer.

The processing device may use each of the N initial hidden layers as a target initial hidden layer. For the target initial hidden layer, the processing device may determine a first pending recognition result corresponding to the target initial hidden layer according to the initial output layer corresponding to the target initial hidden layer and the hidden layer information corresponding to the target initial hidden layer, so that when a first loss function is generated according to the pending recognition result to adjust parameters of the initial output layer, the parameters of the initial output layer corresponding to the target initial hidden layer can fit the characteristics of the hidden layer information of the target initial hidden layer with a higher degree, so that the initial output layer can more accurately determine the speech recognition result corresponding to the hidden layer information calculated by the target initial hidden layer.

Therefore, during actual application, the output layer also includes N output layers, the N output layers having a one-to-one correspondence with the N hidden layers. When the hidden layer information corresponding to the $i^{th}$ hidden layer is outputted to the output layer to obtain the speech recognition result corresponding to the speech, the processing device may output the hidden layer information corresponding to the $i^{th}$ hidden layer to the output layer corresponding to the $i^{th}$ hidden layer when the speech recognition accuracy meets a result output condition, to obtain the speech recognition result corresponding to the speech, thereby improving the accuracy of the speech recognition result.

Because different hidden layers have different capabilities for learning acoustic information in audio features, a later hidden layer has a stronger learning capability with the support of more complex iterative calculation. Therefore, the speech recognition capabilities provided by different hidden layers are different. Based on this, to make the model training more proper, the processing device may set a corresponding output weight parameter for each hidden layer. The output weight parameter is configured for controlling influence of an output of the hidden layer on the overall speech recognition accuracy of the model.

When determining the first loss function, the processing device may determine the first loss function according to the differences between the first pending recognition results respectively corresponding to the N initial hidden layers and the sample recognition result corresponding to the first target sample speech and output weight parameters respectively corresponding to the N initial hidden layers, so that more accurate and fine-grained control can be performed on the parameter adjustment based on the output weight parameters, to achieve a better training effect. The output weight parameter may be adjusted according to the model training effect.

Similarly, because the hidden layer information corresponding to each hidden layer may be particular, the accuracy prediction model predicts speech recognition accuracy based on the hidden layer information. Therefore, in one embodiment, to improve the properness of accuracy prediction, the processing device may alternatively respectively set independent accuracy prediction models for the plurality of hidden layers to perform accuracy prediction.

During training, the initial accuracy prediction model may include N−1 initial accuracy prediction models, the N−1 initial accuracy prediction models having a one-to-one correspondence with first N−1 initial hidden layers in the N initial hidden layers. The reason for that N−1 initial accuracy prediction models are set herein is that if the hidden layer information calculated by the N−1 hidden layer still does not meet the result output condition, only the $N^{th}$ hidden layer with higher calculation accuracy is left, and only the hidden layer information of this hidden layer can be selected to output a speech recognition result, so that it is unnecessary to predict the speech recognition accuracy for the $N^{th}$ hidden layer.

The processing device may use each of the first N−1 initial hidden layers as a target initial hidden layer. When determining the pending speech recognition accuracy respectively corresponding to the N initial hidden layers, the processing device may only calculate pending speech recognition accuracy of the first N−1 initial hidden layers. The processing device may determine pending speech recognition accuracy corresponding to the target initial hidden layer according to the initial accuracy prediction model corresponding to the target initial hidden layer and the hidden layer information corresponding to the target initial hidden layer, so that when a second loss function is determined based on the pending speech recognition accuracy to perform parameter adjustment on the initial accuracy prediction model, the accuracy prediction model obtained after the adjustment can fit the characteristics of the hidden layer information corresponding to the target initial hidden layer to a higher degree, so that more accurate speech recognition accuracy prediction can be performed on the hidden layer information of the target initial hidden layer.

During actual application, the accuracy prediction model may include N−1 accuracy prediction models, the N−1 accuracy prediction models having a one-to-one correspondence with first N−1 hidden layers in the N hidden layers. When predicting the speech recognition accuracy corresponding to the $i^{th}$ hidden layer, the processing device may predict the speech recognition accuracy corresponding to the $i^{th}$ hidden layer according to the hidden layer information corresponding to the $i^{th}$ hidden layer and an accuracy prediction model corresponding to the $i^{th}$ hidden layer, thereby improving the properness of the speech recognition accuracy.

Certainly, the N hidden layers may alternatively correspond to the same output layer and accuracy prediction model with the same parameters, to reduce the model volume.

Similarly, to make the model training more proper, the processing device may alternatively set a corresponding recognition weight parameter for each hidden layer. The recognition weight parameter is configured for controlling influence of recognition accuracy prediction of each hidden layer on the overall speech recognition accuracy prediction of the model.

When determining the second loss function, the processing device may determine the second loss function according to the differences between the pending speech recognition accuracy respectively corresponding to the N initial hidden layers and the sample speech recognition accuracy and determine the second loss function according to recognition weight parameters respectively corresponding to the N initial hidden layers, to achieve more accurate and fine-grained control. The recognition weight parameter may also be adjusted according to the model training effect.

For example, the loss function may be represented by the following formula:

$$L = \sum_{i=1}^{N} \alpha_i L_{lab}^i + \sum_{i=1}^{N-1} \beta_i L_{mse}^i$$

where $\sum_{i=1}^{N} \alpha_i L_{lab}^i$ is the first loss function, $\alpha_i$ is the output weight parameter corresponding to the $i^{th}$ hidden layer, $L_{lab}^i$ is configured for identifying a difference between the first pending recognition result corresponding to the $i^{th}$ hidden layer and the sample recognition result corresponding to the first target sample speech; and $\sum_{i=1}^{N-1} \beta_i L_{mse}^i$ is the second loss function, $\beta_i$ is the recognition weight parameter corresponding to the $i^{th}$ hidden layer, and $L_{mse}^i$ is configured for identifying a difference between the pending speech recognition accuracy corresponding to the $i^{th}$ hidden layer and the sample speech recognition accuracy.

A formula for calculating $L_{mse}^i$ may be as follows:

$$L_{mse}^i = (f_i - y_i)^2$$

where $f_i$ is the sample speech recognition accuracy corresponding to the $i^{th}$ hidden layer, and $y_i$ is the pending speech recognition accuracy corresponding to the $i^{th}$ hidden layer.

It may be understood that, a speech is usually a piece of speech data. The speech includes a plurality of audio frames. The plurality of audio frames can reflect characteristics of the speech in a time dimension. When the speech data is multi-dimensional data in the time dimension, hidden layer information outputted by a hidden layer is also multi-dimensional data in the time dimension, and the quantity of dimensions corresponds to the quantity of audio frames of the speech. The speech recognition accuracy determined based on the hidden layer information is usually a one-dimensional value. Therefore, in the process of determining the speech recognition accuracy based on the hidden layer information, a compression operation in the time dimension is usually performed to obtain global features of the hidden layer information in the time dimension.

However, when the time dimension of data is compressed, part of the information in the time dimension will be lost. When a hidden layer is relatively close to the beginning, due to a relatively small quantity of times of iterative calculation, the hidden layer's calculation and analysis capability for audio features is relatively weak, and its learning capability on sub-acoustic information is relatively weak, so that it is difficult to perform relatively accurate analysis on the speech recognition result of the speech based on the determined hidden layer information. In this case, if information of the hidden layer information in the time dimension is further reduced, it may be difficult for the accuracy prediction model to perform accurate prediction based on the compressed hidden layer information. When a hidden layer is relatively close to the end, due to the iterative calculation of a plurality of hidden layers, the hidden layer has a relatively strong analysis capability for audio features and has a strong learning capability for acoustic information, so that the outputted hidden layer information can already fully highlight the characteristics of the speech in audio. Even if data compression is performed in the time dimension, influence on the capability of the hidden layer information to identify the speech recognition result is slight. Based on this, in one embodiment, to improve the accuracy of speech recognition accuracy prediction, the processing device may perform compression in different manners on hidden layers at different positions.

Specifically, the speech recognition accuracy is a one-dimensional value. The speech includes T audio frames. The hidden layer information corresponding to the $i^{th}$ hidden layer is the hidden layer information with a time dimension T. When predicting the speech recognition accuracy corresponding to the $i^{th}$ hidden layer, the processing device may preset a quantity M of hidden layers, where M is a positive integer less than N, and is configured for determining whether the $i^{th}$ hidden layer is a relatively previous hidden layer or a relatively late hidden layer in the iterative calculation.

When i is less than or equal to M, the processing device may determine that the $i^{th}$ hidden layer is a relatively previous hidden layer and has a relatively weak calculation and analysis capability for audio features, so that the hidden layer information corresponding to the hidden layer is less reflective of the acoustic features. In this case, the processing device may input the hidden layer information with the time dimension T into the accuracy prediction model corresponding to the $i^{th}$ hidden layer, so that the accuracy prediction model performs calculation on the hidden layer information with the time dimension T based on the time dimension to obtain the speech recognition accuracy. Therefore, a first accuracy prediction model can analyze the hidden layer information in combination with features in the time dimension to determine relatively accurate speech recognition accuracy. The accuracy prediction model is a model that can analyze time dimension features. For example, the accuracy prediction model may be a formed by any one of a feedforward neural network (FFN), a recurrent neural network (RNN), a long-short term memory (LSTM) network, a convolutional neural network (CNN), a transformer, or a hybrid network Conformer.

When i is greater than M, the processing device may determine that the $i^{th}$ hidden layer is a relatively late hidden layer and has a relatively strong calculation and analysis capability for audio features, so that the hidden layer information corresponding to the hidden layer is highly reflective of the acoustic features. Even if the features in the time dimension are relatively weak, relatively accurate speech recognition accuracy analysis can be performed. The processing device may compress the hidden layer information with the time dimension T in the time dimension to obtain the hidden layer information with a time dimension 1, and then input the hidden layer information with the time dimension 1 to the accuracy prediction model corresponding to the $i^{th}$ hidden layer, to obtain the speech recognition accuracy. Therefore, the accuracy prediction model does not need to analyze the features in the time dimension, which reduces the calculation amount of the model, improves the analysis speed of the speech recognition accuracy, thereby improving the speech recognition efficiency. The accuracy prediction model may be a relatively simple model formed by a plurality of feedforward layers.

That is, in the present disclosure, N hidden layers are divided into two types with M as a boundary: previous hidden layers (i is less than or equal to M) and late hidden layers (i is greater than M). For different types of hidden layers, different processing methods and accuracy prediction models are used to determine corresponding speech recognition accuracy in the present disclosure, thereby improving the accuracy and efficiency of speech recognition.

There may also be a plurality of manners in which the processing device compresses the time dimension. In one embodiment, the processing device may calculate a variance and an average value that are corresponding to the hidden layer information with the time dimension T in the time dimension, and then slice the variance and the average value, to obtain the hidden layer information with the time dimension 1. For example, an output of a hidden layer is a T*H matrix, where T is the quantity of speech frames, H is the quantity of hidden layer nodes, H remains fixed, and T changes with the audio length of the speech. The information in the time dimension needs to be compressed to extract global features. In the present disclosure, two statistics that can reflect global information are designed, which are average value and variance respectively. The average value and the variance are both calculated in the time dimension. During average value calculation, a 1*H matrix vector can be obtained, and during variance calculation, a 1*H vector can be obtained. Subsequently, the average value vector and the variance vector are spliced to obtain a 1*2W global feature vector. The global feature vector is the compressed hidden layer information.

There may also be a plurality of measurement indicators of speech recognition accuracy. In one embodiment, the speech recognition accuracy may be a word error rate (WER). A higher the word error rate indicates a greater difference between the speech recognition result recognized by the speech recognition model and the accurate recognition result corresponding to the speech, and lower speech recognition accuracy. The result output condition is that the WER does not exceed a WER threshold, and the accuracy prediction model is a WER prediction model. When predicting speech recognition accuracy, the processing device may predict a WER corresponding to the $i^{th}$ hidden layer according to the hidden layer information and the WER prediction model that are corresponding to the $i^{th}$ hidden layer. When the WER does not exceed the WER threshold, it indicates that an accurate speech recognition result can already be determined according to the hidden layer information outputted by the $i^{th}$ hidden layer, and the processing device may output the hidden layer information corresponding to the $i^{th}$ hidden layer to the output layer, to obtain the speech recognition result corresponding to the speech.

As mentioned above, each hidden layer has a certain speech recognition capability, and a later hidden layer in the iterative calculation has a stronger speech recognition capability. More hidden layers in the model indicate more complex iterative calculation and more consumed computing processing resources. Based on this, in one embodiment, to enable the speech recognition model to run relatively smoothly and stably on various devices and avoid speech recognition lagging or failure due to excessive required computing resources, the processing device may determine the quantity of hidden layers in the speech recognition model based on the processing performance of a device on which the speech recognition model is deployed.

The processing device may acquire performance parameters corresponding to a speech recognition device, the speech recognition device being configured to carry the speech recognition model and the accuracy prediction model. The performance parameters are configured for identifying information processing performance of the speech recognition device, and may be, for example, central processing unit (CPU) performance parameters.

The processing device may determine the quantity N of hidden layers corresponding to the speech recognition model according to the performance parameters, the quantity N of hidden layers meeting that when the output layer determines a speech recognition result corresponding to the speech based on hidden layer information corresponding to an $N^{th}$ hidden layer, a performance utilization rate corresponding to the speech recognition device does not exceed a utilization rate threshold. The utilization rate threshold is configured for measuring processing stress of the speech recognition device. When the foregoing conditions are met, it indicates that even if all hidden layers participate in speech recognition, no excessive processing pressure will be caused to the speech recognition device.

In addition, the processing device may also train a speech recognition model with a quantity of hidden layers greater than N through the foregoing model training manner, and then after determining N based on the foregoing analysis manner, extract the first N hidden layers, the input layer, and the output layer from the speech recognition model to form the speech recognition model corresponding to the speech recognition device. Therefore, the processing device may perform flexible setting for devices with different processing performance, so that the model may also be applied to offline speech recognition with limited resources on terminals such as mobile phones.

In addition to flexibly setting the architecture of the speech recognition model, the result output condition configured for determining whether to output a speech recognition result may also be flexibly set. In one embodiment, to meet speech recognition requirements of various accuracies, the processing device may construct the result output condition based on the speech recognition accuracy requirements of an initiation party of the speech recognition request.

The processing device may first acquire a speech recognition request, the speech recognition request including the speech and target speech recognition accuracy. The target speech recognition accuracy is speech recognition accuracy required by the initiation party. The processing device may determine the result output condition according to the target speech recognition accuracy, so that the speech recognition accuracy meets the needs of the initiation party.

As mentioned above, if the hidden layer information calculated by the N−1 hidden layer still does not meet the result output condition, only the $N^{th}$ hidden layer with higher calculation accuracy is left, and only the hidden layer information of this hidden layer can be selected to output a speech recognition result, so that it is unnecessary to predict the speech recognition accuracy for the $N^{th}$ hidden layer. Based on this, in one embodiment, when the speech recognition accuracy corresponding to the $(N-1)^{th}$ hidden layer does not meet the result output condition, the processing device may directly output the hidden layer information corresponding to the $N^{th}$ hidden layer to the output layer after the $N^{th}$ hidden layer completes iterative calculation, to obtain the speech recognition result corresponding to the speech, thereby further improving the speech recognition efficiency.

For ease of understanding of the technical solutions provided in the embodiments of the present disclosure, a speech recognition method provided in the embodiments of the present disclosure is described below with reference to an actual application scenario.

Figure 4:
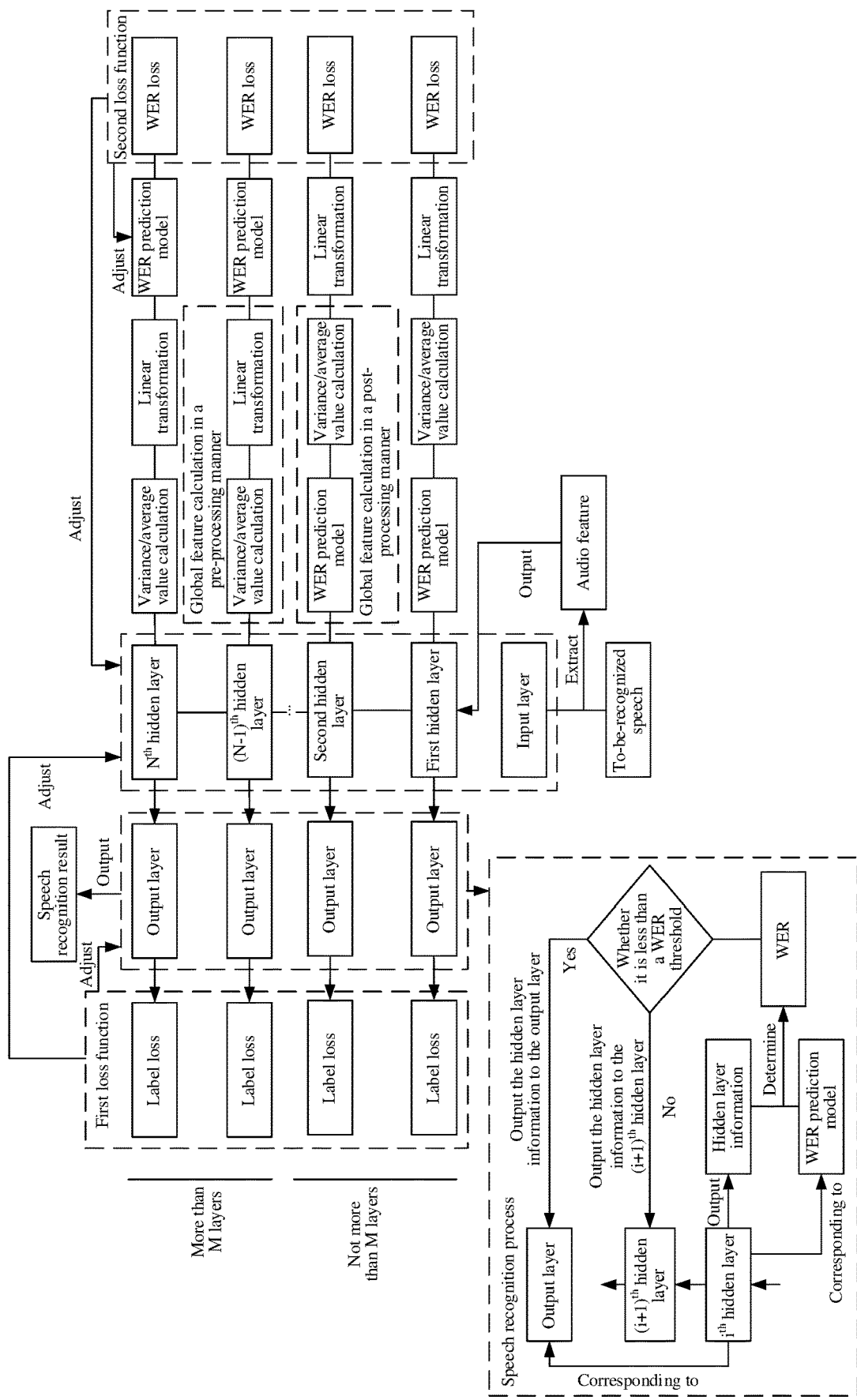
FIG. 4 is a schematic diagram of a speech recognition method in an actual application scenario according to an embodiment of the present disclosure.

FIG. 4 is a schematic diagram of a speech recognition method in an actual application scenario according to an embodiment of the present disclosure. In this actual application scenario, the speech recognition accuracy is the WER, and the accuracy prediction model is the WER prediction model.

During training, the processing device may obtain a label loss corresponding to each hidden layer based on a difference between the pending speech recognition result outputted by the output layer corresponding to each hidden layer and the sample recognition result corresponding to the sample speech, thereby generating the first loss function; and obtain a WER loss corresponding to each hidden layer based on a difference between a pending WER outputted by a WER recognition model corresponding to each hidden layer and a sample WER calculated by the output layer, thereby obtaining the second loss function. During parameter adjustment, the parameter adjustment of the hidden layer and the input layer is subject to both the first loss function and the second loss function. The parameter adjustment of the output layer is only subject to the first loss function. The parameter adjustment of the WER prediction model is only subject to the second loss function. The first loss function may be cross entropy, connectionist temporal classification (CTC), lattice-free maximum mutual information (LFMMI), and the like.

The formula for calculating the WER is as follows:

$$WER = \frac{S+D+I}{N}$$

where S is the quantity of substitution errors, D is the quantity of deletion errors, I is the quantity of insertion errors, and N is the total quantity of words. A lower WER indicates more accurate recognition.

Each hidden layer may have the same structure or a different structure. The hidden layer structure of each layer includes, but not limited to, a feedforward neural network (FFN), a recurrent neural network (RNN), a long-short term memory (LSTM) network, a convolutional neural network (CNN), a Transformer, a Conformer, and the like. Hidden layer parameters of each hidden layer include a weight, an offset, and an activation function. The weight is the connection strength between the neurons contained in the hidden layer. The magnitude of the weight represents the possibility.

The offset is set to correctly classify samples, and is an important parameter in the model, which is equivalent to adding a constant.

The activation has a function of nonlinear mapping, which can limit the output amplitude of the neurons to a certain range, generally to (−1~1) or (0~1). The most commonly used activation function is the Sigmoid function, which can map numbers from (−∞, +∞) to the range of (0~1). Each layer of the model may include operations of matrix multiplication and vector addition in actual calculation.

When hidden layers not more than M layers predict the WER, global feature calculation is performed in a post-processing manner to ensure the accuracy of the WER prediction. The processing device first outputs the hidden layer information outputted by the hidden layer to the WER prediction model for prediction, and then performs compression in the time dimension through variance/average value calculation, and obtains one-dimensional data through linear transformation. When hidden layers more than M layers predict the WER, global feature calculation is performed in a pre-processing manner to improve the efficiency of the WER prediction. The processing device first performs compression in the time dimension through variance/average value calculation, then obtains one-dimensional data through linear transformation, and then predicts the WER through the WER prediction model.

In the speech recognition process, when iterative calculation is performed to the $i^{th}$ hidden layer, the processing device determines the WER corresponding to the hidden layer information through the WER prediction model corresponding to the hidden layer, if the WER is less than the WER threshold, outputs the hidden layer information to the output layer corresponding to the $i^{th}$ hidden layer to determine a final speech recognition result; and if the WER is not less than the WER threshold, outputs the hidden layer information to the $(i+1)^{th}$ hidden layer for subsequent iterative calculation, and repeats the foregoing operations on the $(i+1)^{th}$ hidden layer. If the WER corresponding to the $(N-1)^{th}$ hidden layer is still not less than the WER threshold, the speech recognition result is determined directly based on the hidden layer information outputted by the $N^{th}$ hidden layer, and WER prediction is no longer performed.

Figure 5:
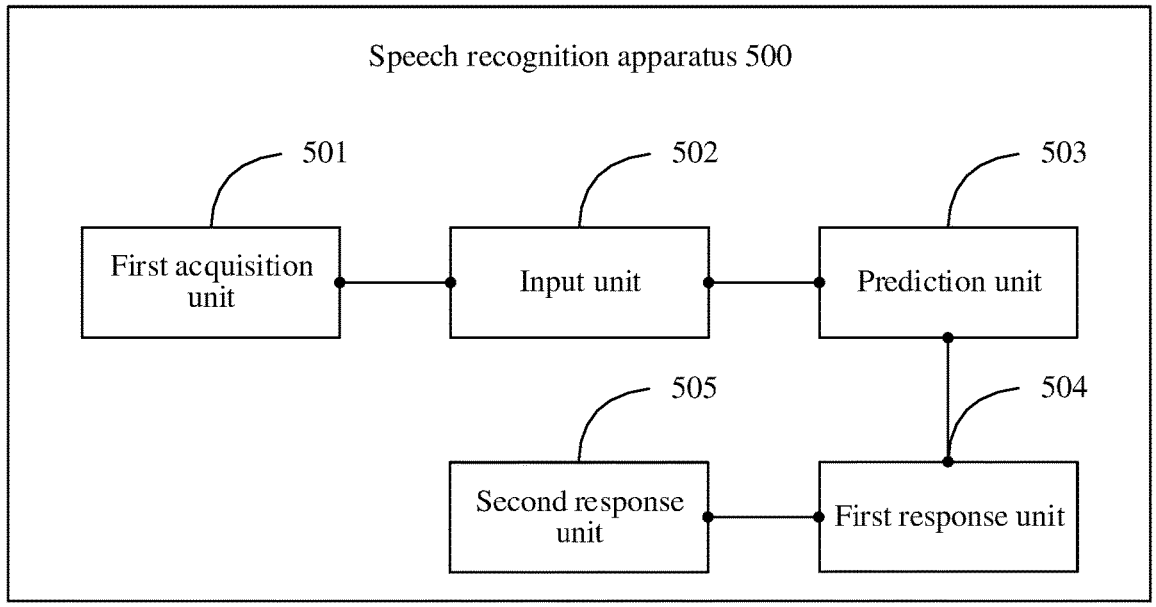
FIG. 5 is a structural block diagram of a speech recognition apparatus according to an embodiment of the present disclosure.

Based on the speech recognition method provided in the foregoing embodiments, an embodiment of the present disclosure further provides a speech recognition apparatus. FIG. 5 is a structural block diagram of a speech recognition apparatus 500 according to an embodiment of the present disclosure. The apparatus includes a first acquisition unit 501, an input unit 502, a prediction unit 503, a first response unit 504, and a second response unit 505, the first acquisition unit 501 being configured to acquire a speech;

the input unit 502 being configured to input the speech into a speech recognition model, the speech recognition model including an input layer, an output layer, and N hidden layers, the input layer being configured to extract an audio feature corresponding to the speech and output the audio feature to a first hidden layer, an $i^{th}$ hidden layer being configured to calculate hidden layer information corresponding to the $i^{th}$ hidden layer based on hidden layer information outputted by a previous layer, and the output layer being configured to determine a speech recognition result corresponding to the speech according to hidden layer information outputted by a hidden layer, N being a positive integer greater than 1, and i being a positive integer not greater than N−1;

the prediction unit 503 being configured to predict speech recognition accuracy corresponding to the $i^{th}$ hidden layer according to the hidden layer information and an accuracy prediction model that are corresponding to the $i^{th}$ hidden layer, the speech recognition accuracy being configured for identifying a degree of matching between a speech recognition result determined according to the hidden layer information of the $i^{th}$ hidden layer and an accurate speech recognition result corresponding to the speech;

the first response unit 504 being configured to output the hidden layer information corresponding to the $i^{th}$ hidden layer to the output layer when the speech recognition accuracy meets a result output condition, to obtain the speech recognition result corresponding to the speech; and the second response unit 505 being configured to output the hidden layer information corresponding to the $i^{th}$ hidden layer to an $(i+1)^{th}$ hidden layer when the speech recognition accuracy does not meet the result output condition.

In one embodiment, the apparatus further includes a second acquisition unit, a second output unit, a first calculation unit, a first determining unit, a second determining unit, a third determining unit, a fourth determining unit, and an adjustment unit, where the second acquisition unit is configured to: acquire an initial speech recognition model, an initial accuracy prediction model, and a first sample speech set, the initial speech recognition model including an initial input layer, an initial output layer, and N initial hidden layers, and the first sample speech set including a plurality of first sample speeches, the first sample speeches having corresponding sample recognition results;

the second output unit is configured to: use each of the plurality of first sample speeches as a first target sample speech, and extract, through the initial output layer, a first audio feature corresponding to the first target sample speech and output the first audio feature to a first initial hidden layer;

the first calculation unit is configured to: perform iterative calculation on the first audio feature through the N initial hidden layers, an $i^{th}$ initial hidden layer being configured to calculate hidden layer information corresponding to the $i^{th}$ initial hidden layer based on hidden layer information outputted by a previous layer, and output the hidden layer information corresponding to the $i^{th}$ initial hidden layer to an $(i+1)^{th}$ initial hidden layer;

the first determining unit is configured to: determine first pending recognition results respectively corresponding to the N initial hidden layers according to hidden layer information respectively corresponding to the N initial hidden layers through the initial output layer;

the second determining unit is configured to: determine a first loss function and sample speech recognition accuracy respectively corresponding to the N initial hidden layers according to differences between the first pending recognition results respectively corresponding to the N initial hidden layers and a sample recognition result corresponding to the first target sample speech;

the third determining unit is configured to: determine pending speech recognition accuracy respectively corresponding to the N initial hidden layers according to the initial accuracy prediction model and the hidden layer information respectively corresponding to the N initial hidden layers;

the fourth determining unit is configured to: determine a second loss function according to differences between the pending speech recognition accuracy and the sample speech recognition accuracy that are respectively corresponding to the N initial hidden layers; and the adjustment unit is configured to: perform parameter adjustment on the initial speech recognition model and the initial accuracy prediction model according to the first loss function and the second loss function, to obtain the speech recognition model and the accuracy prediction model.

In one embodiment, the second acquisition unit is specifically configured to:

acquire a pending speech recognition model and a second sample speech set, the pending speech recognition model including a pending input layer, a pending output layer, and N pending hidden layers, the second sample speech set including a plurality of second sample speeches, the second sample speeches having corresponding sample recognition results;

use each of the plurality of second sample speeches as a second target sample speech, and extract, through the pending output layer, a second audio feature corresponding to the second target sample speech and output the second audio feature to a first pending hidden layer;

perform iterative calculation on the second audio feature through the N pending hidden layers, an $i^{th}$ pending hidden layer being configured to calculate hidden layer information corresponding to the $i^{th}$ pending hidden layer based on hidden layer information outputted by a previous layer, and output the hidden layer information corresponding to the $i^{th}$ pending hidden layer to an $(i+1)^{th}$ pending hidden layer;

determine second pending recognition results respectively corresponding to the N pending hidden layers according to hidden layer information respectively corresponding to the N pending hidden layers through the pending output layer;

determine a third loss function according to differences between the second pending recognition results respectively corresponding to the N pending hidden layers and a sample recognition result corresponding to the second target sample speech; and perform parameter adjustment on the pending speech recognition model by using the third loss function, to obtain the initial speech recognition model; and the adjustment unit is specifically configured to:

perform parameter adjustment on the N initial hidden layers and the initial input layer according to the first loss function and the second loss function, to obtain the N hidden layers and the input layer, perform parameter adjustment on the initial accuracy prediction model according to the second loss function, to obtain the accuracy prediction model, and determine the initial output layer as the output layer.

In one embodiment, the initial output layer includes N initial output layers, the N initial output layers having a one-to-one correspondence with the N initial hidden layers, each of the N initial hidden layers is used as a target initial hidden layer, and the first determining unit is specifically configured to:

determine a first pending recognition result corresponding to the target initial hidden layer according to an initial output layer corresponding to the target initial hidden layer and hidden layer information corresponding to the target initial hidden layer; and the output layer includes N output layers, the N output layers having a one-to-one correspondence with the N hidden layers, and the first response unit 504 is specifically configured to:

output the hidden layer information corresponding to the $i^{th}$ hidden layer to an output layer corresponding to the $i^{th}$ hidden layer when the speech recognition accuracy meets the result output condition, to obtain the speech recognition result corresponding to the speech.

In one embodiment, the second determining unit is specifically configured to:

determine the first loss function according to the differences between the first pending recognition results respectively corresponding to the N initial hidden layers and the sample recognition result corresponding to the first target sample speech and output weight parameters respectively corresponding to the N initial hidden layers.

In one embodiment, the initial accuracy prediction model includes N−1 initial accuracy prediction models, the N−1 initial accuracy prediction models having a one-to-one correspondence with first N−1 initial hidden layers in the N initial hidden layers, each of the first N−1 initial hidden layers is used as a target initial hidden layer, and the third determining unit is specifically configured to:

determine pending speech recognition accuracy corresponding to the target initial hidden layer according to an initial accuracy prediction model corresponding to the target initial hidden layer and hidden layer information corresponding to the target initial hidden layer; and the accuracy prediction model includes N−1 accuracy prediction models, the N−1 accuracy prediction models having a one-to-one correspondence with first N−1 hidden layers in the N hidden layers, and the prediction unit is specifically configured to:

predict the speech recognition accuracy corresponding to the $i^{th}$ hidden layer according to the hidden layer information corresponding to the $i^{th}$ hidden layer and the accuracy prediction model corresponding to the $i^{th}$ hidden layer.

In one embodiment, the speech recognition accuracy is a one-dimensional value, the speech includes T audio frames, the hidden layer information corresponding to the $i^{th}$ hidden layer is hidden layer information with a time dimension T, and the prediction unit 503 is specifically configured to:

input the hidden layer information with the time dimension T into the accuracy prediction model corresponding to the $i^{th}$ hidden layer when i is less than or equal to M, so that the accuracy prediction model corresponding to the $i^{th}$ hidden layer performs calculation on the hidden layer information with the time dimension T based on a time dimension to obtain the speech recognition accuracy, M being a positive integer less than N;

compress the hidden layer information with the time dimension T in the time dimension when i is greater than M, to obtain hidden layer information with a time dimension 1; and input the hidden layer information with the time dimension 1 into the accuracy prediction model corresponding to the $i^{th}$ hidden layer, to obtain the speech recognition accuracy.

In one embodiment, the prediction unit 503 is specifically configured to:

calculate a variance and an average value that are corresponding to the hidden layer information with the time dimension T in the time dimension; and splice the variance and the average value to obtain the hidden layer information with the time dimension 1.

In one embodiment, the speech recognition accuracy is a word error rate (WER), the result output condition is that the WER does not exceed a WER threshold, the accuracy prediction model is a WER prediction model, and the prediction unit is specifically configured to:

predict a WER corresponding to the $i^{th}$ hidden layer according to the hidden layer information and the WER prediction model that are corresponding to the $i^{th}$ hidden layer; and the first response unit 504 is specifically configured to:

output the hidden layer information corresponding to the $i^{th}$ hidden layer to the output layer when the WER does not exceed the WER threshold, to obtain the speech recognition result corresponding to the speech.

In one embodiment, the apparatus further includes: a third acquisition unit and a fifth determining unit, where the third acquisition unit is configured to: acquire performance parameters corresponding to a speech recognition device, the speech recognition device being configured to carry the speech recognition model and the accuracy prediction model, and the performance parameters being configured for identifying information processing performance of the speech recognition device; and the fifth determining unit is configured to: determine the quantity N of hidden layers corresponding to the speech recognition model according to the performance parameters, the quantity N of hidden layers meeting that when the output layer determines a speech recognition result corresponding to the speech based on hidden layer information corresponding to an $N^{th}$ hidden layer, a performance utilization rate corresponding to the speech recognition device does not exceed a utilization rate threshold.

In one embodiment, the first acquisition unit 501 is specifically configured to:

acquire a speech recognition request, the speech recognition request including the speech and target speech recognition accuracy; and determine the result output condition according to the target speech recognition accuracy.

In one embodiment, the apparatus further includes a third response unit, where the third response unit is configured to: output the hidden layer information corresponding to the $N^{th}$ hidden layer to the output layer when speech recognition accuracy corresponding to an $(N-1)^{th}$ hidden layer does not meet the result output condition, to obtain the speech recognition result corresponding to the speech.

Figure 6:
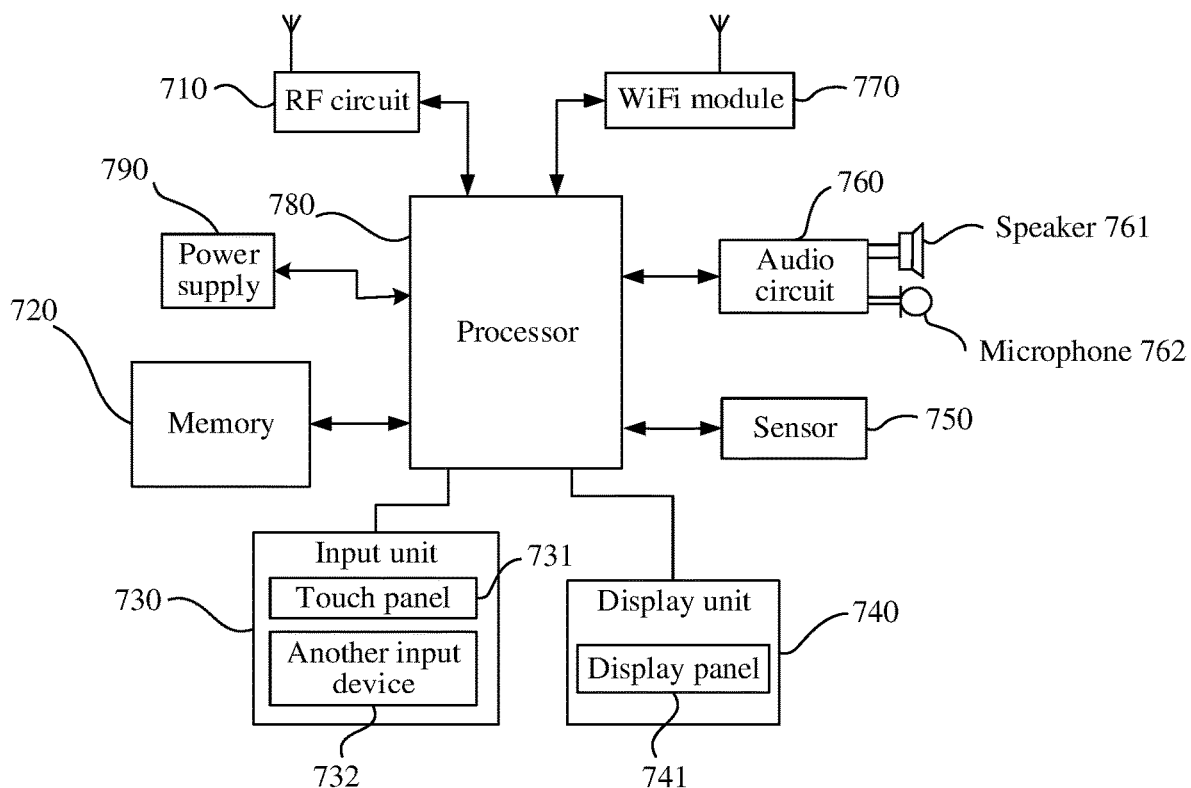
FIG. 6 is a structural diagram of a terminal according to an embodiment of the present disclosure.

An embodiment of the present disclosure further provides a computer device, and the following describes the device with reference to the accompanying drawings. Referring to FIG. 6, an embodiment of the present disclosure provides a device, and the device may alternatively be a terminal device. The terminal device may be any smart terminal including a mobile phone, a tablet computer, a personal digital assistant (PDA), a point of sales (POS), or an on-board computer, and the terminal device being a mobile phone is used as an example.

FIG. 6 is a block diagram of a structure of a part of a mobile phone related to a terminal device according to an embodiment of the present disclosure. Referring to FIG. 6, the mobile phone includes components such as: a radio frequency (RF) circuit 710, a memory 720, an input unit 730, a display unit 740, a sensor 750, an audio circuit 760, a wireless fidelity (Wi-Fi) module 770, a processor 780, and a power supply 790. A person skilled in the art may understand that the structure of the mobile phone shown in FIG. 6 does not constitute a limitation to the mobile phone, and the mobile phone may include more components or fewer components than those shown in the figure, or some components may be combined, or a different component deployment may be used.

The following makes a detailed description of the components of the mobile phone with reference to FIG. 6:

The RF circuit 710 may be configured to receive and send signals during information transmission and receiving or a conversation.

The memory 720 may be configured to store a software program and module. The processor 780 runs the software program and module stored in the memory 720, to implement various functional applications and data processing of the mobile phone.

The input unit 730 may be configured to receive inputted digit or character information, and generate a keyboard signal input related to the object setting and function control of the mobile phone. Specifically, the input unit 730 may include a touch panel 731 and another input device 732. The touch panel 731 is also referred to as a touch screen.

The display unit 740 may be configured to display information inputted by the object or information provided for the object, and various menus of the mobile phone. The display unit 740 may include a display panel 741.

The mobile phone may further include at least one sensor 750.

The audio circuit 760, a speaker 761, and a microphone 762 may provide audio interfaces between the object and the mobile phone.

The processor 780 is a control center of the mobile phone, and is connected to various parts of the entire mobile phone by using various interfaces and lines. By running or executing the software program and/or the module stored in the memory 720, and invoking data stored in the memory 720, the processor executes various functions of the mobile phone and performs data processing, thereby detecting the entire mobile phone.

The mobile phone further includes the power supply 790 (such as a battery) for supplying power to the components.

Although not shown in the figure, the mobile phone may further include a camera, a Bluetooth module, and the like. Details are not described herein again.

In this embodiment of the present disclosure, the processor 780 included in the terminal device further has the following functions:

acquiring a speech;

inputting the speech into a speech recognition model, the speech recognition model including an input layer, an output layer, and N hidden layers, the input layer being configured to extract an audio feature corresponding to the speech and output the audio feature to a first hidden layer, an $i^{th}$ hidden layer being configured to calculate hidden layer information corresponding to the $i^{th}$ hidden layer based on hidden layer information outputted by a previous layer, and the output layer being configured to determine a speech recognition result corresponding to the speech according to hidden layer information outputted by a hidden layer, N being a positive integer greater than 1, and i being a positive integer not greater than N−1;

predicting speech recognition accuracy corresponding to the $i^{th}$ hidden layer according to the hidden layer information and an accuracy prediction model that are corresponding to the $i^{th}$ hidden layer, the speech recognition accuracy being configured for identifying a degree of matching between a speech recognition result determined according to the hidden layer information of the $i^{th}$ hidden layer and an accurate speech recognition result corresponding to the speech; and outputting the hidden layer information corresponding to the $i^{th}$ hidden layer to the output layer when the speech recognition accuracy meets a result output condition, to obtain the speech recognition result corresponding to the speech; or outputting the hidden layer information corresponding to the $i^{th}$ hidden layer to an $(i+1)^{th}$ hidden layer when the speech recognition accuracy does not meet the result output condition.

Figure 7:
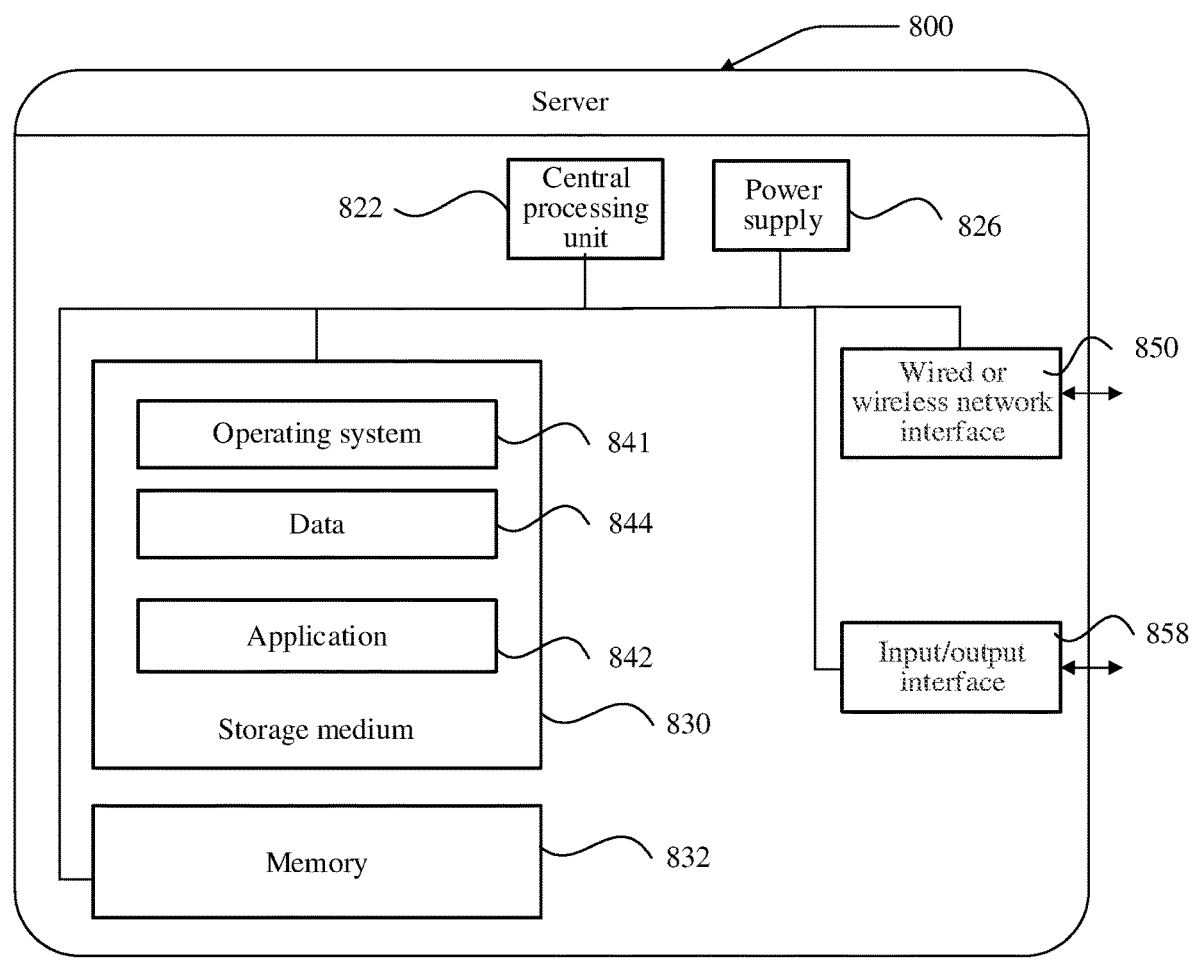
FIG. 7 is a structural diagram of a server according to an embodiment of the present disclosure.

An embodiment of the present disclosure further provides a server. FIG. 7 is a structural diagram of a server 800 according to an embodiment of the present disclosure. The server 800 may vary greatly due to different configurations or performance, and may include one or more central processing units (CPUs) 822 (for example, one or more processors) and a memory 832, and one or more storage media 830 (for example, one or more mass storage devices) that store applications 842 or data 844. The memory 832 and the storage medium 830 may be transient or persistent storages. A program stored in the storage medium 830 may include one or more modules (which are not marked in the figure), and each module may include a series of instruction operations on the server. Further, the CPU 822 may be configured to communicate with the storage medium 830, and perform, on the server 800, the series of instruction operations in the storage medium 830.

The server 800 may further include one or more power supplies 826, one or more wired or wireless network interfaces 850, one or more input/output interfaces 858, and/or one or more operating systems 841, for example, Windows Server™, Mac OS X™, Unix™, Linux™, or FreeBSD™.

The steps performed by the server in the foregoing embodiments may be based on the server structure shown in FIG. 7.

An embodiment of the present disclosure further provides a computer-readable storage medium, configured to store a computer program, the computer program being configured to perform any implementation in the speech recognition method described in the foregoing embodiments.

An embodiment of the present disclosure further provides a computer program product including a computer program, the computer program product, when run on a computer, causing the computer to perform the speech recognition method according to any one of the foregoing embodiments.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium may be at least one of the following media: any medium that can store program code, such as a read-only memory (ROM), a RAM, a magnetic disk, or an optical disc.

The embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore is described briefly; for related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on a plurality of network units. Each unit can be implemented using one or more processors (or processors and memory). Likewise, a processor (or processors and memory) can be used to implement one or more units. Some or all of the modules may be selected according to actual needs to achieve the objectives of the solutions of the embodiments. A person of ordinary skill in the art may understand and implement the embodiments of the present disclosure without creative efforts.

The foregoing descriptions are merely a specific implementation of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A speech recognition method, performed by a processing device, the method comprising:
    acquiring a speech;
    inputting the speech into a speech recognition model, the speech recognition model comprising an input layer, an output layer, and N hidden layers, the input layer being configured to extract an audio feature corresponding to the speech and output the audio feature to a first hidden layer, an $i^{th}$ hidden layer being configured to calculate hidden layer information corresponding to the $i^{th}$ hidden layer based on hidden layer information outputted by a previous layer, and the output layer being configured to determine a speech recognition result corresponding to the speech according to hidden layer information outputted by a hidden layer, N being a positive integer greater than 1, and i being a positive integer not greater than N−1;
    predicting speech recognition accuracy corresponding to the $i^{th}$ hidden layer according to the hidden layer information and an accuracy prediction model that are corresponding to the $i^{th}$ hidden layer, the speech recognition accuracy indicating a degree of matching between a speech recognition result determined according to the hidden layer information of the $i^{th}$ hidden layer and an accurate speech recognition result corresponding to the speech;
    outputting the hidden layer information corresponding to the $i^{th}$ hidden layer to an $(i+1)^{th}$ hidden layer in response to that the speech recognition accuracy does not meet the result output condition; and
    outputting the hidden layer information corresponding to the $i^{th}$ hidden layer to the output layer in response to that the speech recognition accuracy meets a result output condition, to obtain the speech recognition result corresponding to the speech.

2. The method according to claim 1, wherein the method further comprises:
    acquiring an initial speech recognition model, an initial accuracy prediction model, and a first sample speech set, the initial speech recognition model comprising an initial input layer, an initial output layer, and N initial hidden layers, and the first sample speech set comprising a plurality of first sample speeches, the first sample speeches having corresponding sample recognition results;
    respectively using the plurality of first sample speeches as a first target sample speech, and extracting, through the initial output layer, a first audio feature corresponding to the first target sample speech and outputting the first audio feature to a first initial hidden layer;
    performing iterative calculation on the first audio feature through the N initial hidden layers, an $i^{th}$ initial hidden layer being configured to calculate hidden layer information corresponding to the $i^{th}$ initial hidden layer based on hidden layer information outputted by a previous layer, and output the hidden layer information corresponding to the $i^{th}$ initial hidden layer to an $(i+1)^{th}$ initial hidden layer;
    determining first pending recognition results respectively corresponding to the N initial hidden layers according to hidden layer information respectively corresponding to the N initial hidden layers through the initial output layer;
    determining a first loss function and sample speech recognition accuracy respectively corresponding to the N initial hidden layers according to differences between the first pending recognition results respectively corresponding to the N initial hidden layers and a sample recognition result corresponding to the first target sample speech;
    determining pending speech recognition accuracy respectively corresponding to the N initial hidden layers according to the initial accuracy prediction model and the hidden layer information respectively corresponding to the N initial hidden layers;
    determining a second loss function according to differences between the pending speech recognition accuracy and the sample speech recognition accuracy that are respectively corresponding to the N initial hidden layers; and
    performing parameter adjustment on the initial speech recognition model and the initial accuracy prediction model according to the first loss function and the second loss function, to obtain the speech recognition model and the accuracy prediction model.

3. The method according to claim 2, wherein the acquiring an initial speech recognition model comprises:
    acquiring a pending speech recognition model and a second sample speech set, the pending speech recognition model comprising a pending input layer, a pending output layer, and N pending hidden layers, the second sample speech set comprising a plurality of second sample speeches, the second sample speeches having corresponding sample recognition results;
    respectively using the plurality of second sample speeches as a second target sample speech, and extracting, through the pending output layer, a second audio feature corresponding to the second target sample speech and outputting the second audio feature to a first pending hidden layer;
    performing iterative calculation on the second audio feature through the N pending hidden layers, an $i^{th}$ pending hidden layer being configured to calculate hidden layer information corresponding to the $i^{th}$ pending hidden layer based on hidden layer information outputted by a previous layer, and output the hidden layer information corresponding to the $i^{th}$ pending hidden layer to an $(i+1)^{th}$ pending hidden layer;

determining second pending recognition results respectively corresponding to the N pending hidden layers according to hidden layer information respectively corresponding to the N pending hidden layers through the pending output layer;

determining a third loss function according to differences between the second pending recognition results respectively corresponding to the N pending hidden layers and a sample recognition result corresponding to the second target sample speech; and performing parameter adjustment on the pending speech recognition model by using the third loss function, to obtain the initial speech recognition model; and the performing parameter adjustment on the initial speech recognition model and the initial accuracy prediction model according to the first loss function and the second loss function, to obtain the speech recognition model and the accuracy prediction model comprises:

performing parameter adjustment on the N initial hidden layers and the initial input layer according to the first loss function and the second loss function, to obtain the N hidden layers and the input layer, performing parameter adjustment on the initial accuracy prediction model according to the second loss function, to obtain the accuracy prediction model, and determining the initial output layer as the output layer.

4. The method according to claim 2, wherein the initial output layer comprises N initial output layers, the N initial output layers having a one-to-one correspondence with the N initial hidden layers, each of the N initial hidden layers is used as a target initial hidden layer, and the determining first pending recognition results respectively corresponding to the N initial hidden layers according to hidden layer information respectively corresponding to the N initial hidden layers through the initial output layer comprises:

determining a first pending recognition result corresponding to the target initial hidden layer according to an initial output layer corresponding to the target initial hidden layer and hidden layer information corresponding to the target initial hidden layer; and the output layer comprises N output layers, the N output layers having a one-to-one correspondence with the N hidden layers, and the outputting the hidden layer information corresponding to the $i^{th}$ hidden layer to the output layer in response to that the speech recognition accuracy meets a result output condition, to obtain the speech recognition result corresponding to the speech comprises:

outputting the hidden layer information corresponding to the $i^{th}$ hidden layer to an output layer corresponding to the $i^{th}$ hidden layer in response to that the speech recognition accuracy meets the result output condition, to obtain the speech recognition result corresponding to the speech.

5. The method according to claim 2, wherein the determining a first loss function according to differences between the first pending recognition results respectively corresponding to the N initial hidden layers and a sample recognition result corresponding to the first target sample speech comprises:

determining the first loss function according to the differences between the first pending recognition results respectively corresponding to the N initial hidden layers and the sample recognition result corresponding to the first target sample speech and output weight parameters respectively corresponding to the N initial hidden layers.

6. The method according to claim 2, wherein the initial accuracy prediction model comprises N−1 initial accuracy prediction models, the N−1 initial accuracy prediction models having a one-to-one correspondence with first N−1 initial hidden layers in the N initial hidden layers, the first N−1 initial hidden layers are respectively used as a target initial hidden layer, and the determining pending speech recognition accuracy respectively corresponding to the N initial hidden layers according to the initial accuracy prediction model and the hidden layer information respectively corresponding to the N initial hidden layers comprises:

determining pending speech recognition accuracy corresponding to the target initial hidden layer according to an initial accuracy prediction model corresponding to the target initial hidden layer and hidden layer information corresponding to the target initial hidden layer; and the accuracy prediction model comprises N−1 accuracy prediction models, the N−1 accuracy prediction models having a one-to-one correspondence with first N−1 hidden layers in the N hidden layers, and the predicting speech recognition accuracy corresponding to the $i^{th}$ hidden layer according to the hidden layer information and an accuracy prediction model that are corresponding to the $i^{th}$ hidden layer comprises:

predicting the speech recognition accuracy corresponding to the $i^{th}$ hidden layer according to the hidden layer information corresponding to the $i^{th}$ hidden layer and the accuracy prediction model corresponding to the $i^{th}$ hidden layer.

7. The method according to claim 6, wherein the speech recognition accuracy is a one-dimensional value, the speech comprises T audio frames, the hidden layer information corresponding to the $i^{th}$ hidden layer is hidden layer information with a time dimension T, and the predicting the speech recognition accuracy corresponding to the $i^{th}$ hidden layer according to the hidden layer information corresponding to the $i^{th}$ hidden layer and the accuracy prediction model corresponding to the $i^{th}$ hidden layer comprises:

inputting the hidden layer information with the time dimension T into the accuracy prediction model corresponding to the $i^{th}$ hidden layer when i is less than or equal to M, so that the accuracy prediction model corresponding to the $i^{th}$ hidden layer performs calculation on the hidden layer information with the time dimension T based on a time dimension to obtain the speech recognition accuracy, M being a positive integer less than N;

compressing the hidden layer information with the time dimension T in the time dimension when i is greater than M, to obtain hidden layer information with a time dimension 1; and inputting the hidden layer information with the time dimension 1 into the accuracy prediction model corresponding to the $i^{th}$ hidden layer, to obtain the speech recognition accuracy.

8. The method according to claim 7, wherein the compressing the hidden layer information with the time dimension T in the time dimension, to obtain hidden layer information with a time dimension 1 comprises:

calculating a variance and an average value that are corresponding to the hidden layer information with the time dimension T in the time dimension; and splicing the variance and the average value to obtain the hidden layer information with the time dimension 1.

9. The method according to claim 1, wherein the speech recognition accuracy is a word error rate (WER), the result output condition is that the WER does not exceed a WER threshold, the accuracy prediction model is a WER prediction model, and the predicting speech recognition accuracy corresponding to the $i^{th}$ hidden layer according to the hidden layer information and an accuracy prediction model that are corresponding to the $i^{th}$ hidden layer comprises:

predicting a WER corresponding to the $i^{th}$ hidden layer according to the hidden layer information and the WER prediction model that are corresponding to the $i^{th}$ hidden layer; and the outputting the hidden layer information corresponding to the $i^{th}$ hidden layer to the output layer in response to that the speech recognition accuracy meets a result output condition, to obtain the speech recognition result corresponding to the speech comprises:

outputting the hidden layer information corresponding to the $i^{th}$ hidden layer to the output layer in response to that the WER does not exceed the WER threshold, to obtain the speech recognition result corresponding to the speech.

10. The method according to claim 1, further comprising:

acquiring performance parameters corresponding to a speech recognition device, the speech recognition device being configured to carry the speech recognition model and the accuracy prediction model, and the performance parameters being configured for identifying information processing performance of the speech recognition device; and determining the quantity N of hidden layers corresponding to the speech recognition model according to the performance parameters, the quantity N of hidden layers meeting that when the output layer determines a speech recognition result corresponding to the speech based on hidden layer information corresponding to an $N^{th}$ hidden layer, a performance utilization rate corresponding to the speech recognition device does not exceed a utilization rate threshold.

11. The method according to claim 1, wherein the acquiring a speech comprises:

acquiring a speech recognition request, the speech recognition request comprising the speech and target speech recognition accuracy; and the method further comprises:

determining the result output condition according to the target speech recognition accuracy.

12. The method according to claim 1, further comprising:

outputting the hidden layer information corresponding to the $N^{th}$ hidden layer to the output layer when speech recognition accuracy corresponding to an $(N-1)^{th}$ hidden layer does not meet the result output condition, to obtain the speech recognition result corresponding to the speech.

13. A speech recognition apparatus, comprising at least one processor and at least one memory, the at least one memory being configured to store a computer program, and transmit the computer program to the at least one processor; and the at least one processor being configured to execute the computer program and perform:

acquiring a speech;

inputting the speech into a speech recognition model, the speech recognition model comprising an input layer, an output layer, and N hidden layers, the input layer being configured to extract an audio feature corresponding to the speech and output the audio feature to a first hidden layer, an $i^{th}$ hidden layer being configured to calculate hidden layer information corresponding to the $i^{th}$ hidden layer based on hidden layer information outputted by a previous layer, and the output layer being configured to determine a speech recognition result corresponding to the speech according to hidden layer information outputted by a hidden layer, N being a positive integer greater than 1, and i being a positive integer not greater than N−1;

predicting speech recognition accuracy corresponding to the $i^{th}$ hidden layer according to the hidden layer information and an accuracy prediction model that are corresponding to the $i^{th}$ hidden layer, the speech recognition accuracy indicating a degree of matching between a speech recognition result determined according to the hidden layer information of the $i^{th}$ hidden layer and an accurate speech recognition result corresponding to the speech;

outputting the hidden layer information corresponding to the $i^{th}$ hidden layer to an $(i+1)^{th}$ hidden layer in response to that the speech recognition accuracy does not meet the result output condition; and outputting the hidden layer information corresponding to the $i^{th}$ hidden layer to the output layer in response to that the speech recognition accuracy meets a result output condition, to obtain the speech recognition result corresponding to the speech.

14. The apparatus according to claim 13, wherein the computer program further caused the at least one processor to perform:

acquiring an initial speech recognition model, an initial accuracy prediction model, and a first sample speech set, the initial speech recognition model comprising an initial input layer, an initial output layer, and N initial hidden layers, and the first sample speech set comprising a plurality of first sample speeches, the first sample speeches having corresponding sample recognition results;

respectively using the plurality of first sample speeches as a first target sample speech, and extracting, through the initial output layer, a first audio feature corresponding to the first target sample speech and outputting the first audio feature to a first initial hidden layer;

performing iterative calculation on the first audio feature through the N initial hidden layers, an $i^{th}$ initial hidden layer being configured to calculate hidden layer information corresponding to the $i^{th}$ initial hidden layer based on hidden layer information outputted by a previous layer, and output the hidden layer information corresponding to the $i^{th}$ initial hidden layer to an $(i+1)^{th}$ initial hidden layer;

determining first pending recognition results respectively corresponding to the N initial hidden layers according to hidden layer information respectively corresponding to the N initial hidden layers through the initial output layer;

determining a first loss function and sample speech recognition accuracy respectively corresponding to the N initial hidden layers according to differences between the first pending recognition results respectively corresponding to the N initial hidden layers and a sample recognition result corresponding to the first target sample speech;

determining pending speech recognition accuracy respectively corresponding to the N initial hidden layers according to the initial accuracy prediction model and the hidden layer information respectively corresponding to the N initial hidden layers;

determining a second loss function according to differences between the pending speech recognition accuracy and the sample speech recognition accuracy that are respectively corresponding to the N initial hidden layers; and performing parameter adjustment on the initial speech recognition model and the initial accuracy prediction model according to the first loss function and the second loss function, to obtain the speech recognition model and the accuracy prediction model.

15. The apparatus according to claim 14, wherein the acquiring an initial speech recognition model comprises:

acquiring a pending speech recognition model and a second sample speech set, the pending speech recognition model comprising a pending input layer, a pending output layer, and N pending hidden layers, the second sample speech set comprising a plurality of second sample speeches, the second sample speeches having corresponding sample recognition results;

respectively using the plurality of second sample speeches as a second target sample speech, and extracting, through the pending output layer, a second audio feature corresponding to the second target sample speech and outputting the second audio feature to a first pending hidden layer;

performing iterative calculation on the second audio feature through the N pending hidden layers, an $i^{th}$ pending hidden layer being configured to calculate hidden layer information corresponding to the $i^{th}$ pending hidden layer based on hidden layer information outputted by a previous layer, and output the hidden layer information corresponding to the $i^{th}$ pending hidden layer to an $(i+1)^{th}$ pending hidden layer;

determining second pending recognition results respectively corresponding to the N pending hidden layers according to hidden layer information respectively corresponding to the N pending hidden layers through the pending output layer;

determining a third loss function according to differences between the second pending recognition results respectively corresponding to the N pending hidden layers and a sample recognition result corresponding to the second target sample speech; and performing parameter adjustment on the pending speech recognition model by using the third loss function, to obtain the initial speech recognition model; and the performing parameter adjustment on the initial speech recognition model and the initial accuracy prediction model according to the first loss function and the second loss function, to obtain the speech recognition model and the accuracy prediction model comprises:

performing parameter adjustment on the N initial hidden layers and the initial input layer according to the first loss function and the second loss function, to obtain the N hidden layers and the input layer, performing parameter adjustment on the initial accuracy prediction model according to the second loss function, to obtain the accuracy prediction model, and determining the initial output layer as the output layer.

16. The apparatus according to claim 14, wherein the initial output layer comprises N initial output layers, the N initial output layers having a one-to-one correspondence with the N initial hidden layers, each of the N initial hidden layers is used as a target initial hidden layer, and the determining first pending recognition results respectively corresponding to the N initial hidden layers according to hidden layer information respectively corresponding to the N initial hidden layers through the initial output layer comprises:

determining a first pending recognition result corresponding to the target initial hidden layer according to an initial output layer corresponding to the target initial hidden layer and hidden layer information corresponding to the target initial hidden layer; and the output layer comprises N output layers, the N output layers having a one-to-one correspondence with the N hidden layers, and the outputting the hidden layer information corresponding to the $i^{th}$ hidden layer to the output layer in response to that the speech recognition accuracy meets a result output condition, to obtain the speech recognition result corresponding to the speech comprises:

outputting the hidden layer information corresponding to the $i^{th}$ hidden layer to an output layer corresponding to the $i^{th}$ hidden layer in response to that the speech recognition accuracy meets the result output condition, to obtain the speech recognition result corresponding to the speech.

17. The apparatus according to claim 14, wherein the determining a first loss function according to differences between the first pending recognition results respectively corresponding to the N initial hidden layers and a sample recognition result corresponding to the first target sample speech comprises:

determining the first loss function according to the differences between the first pending recognition results respectively corresponding to the N initial hidden layers and the sample recognition result corresponding to the first target sample speech and output weight parameters respectively corresponding to the N initial hidden layers.

18. The apparatus according to claim 14, wherein the initial accuracy prediction model comprises N−1 initial accuracy prediction models, the N−1 initial accuracy prediction models having a one-to-one correspondence with first N−1 initial hidden layers in the N initial hidden layers, the first N−1 initial hidden layers are respectively used as a target initial hidden layer, and the determining pending speech recognition accuracy respectively corresponding to the N initial hidden layers according to the initial accuracy prediction model and the hidden layer information respectively corresponding to the N initial hidden layers comprises:

determining pending speech recognition accuracy corresponding to the target initial hidden layer according to an initial accuracy prediction model corresponding to the target initial hidden layer and hidden layer information corresponding to the target initial hidden layer; and the accuracy prediction model comprises N−1 accuracy prediction models, the N−1 accuracy prediction models having a one-to-one correspondence with first N−1 hidden layers in the N hidden layers, and the predicting speech recognition accuracy corresponding to the $i^{th}$ hidden layer according to the hidden layer information and an accuracy prediction model that are corresponding to the $i^{th}$ hidden layer comprises:

predicting the speech recognition accuracy corresponding to the $i^{th}$ hidden layer according to the hidden layer information corresponding to the $i^{th}$ hidden layer and the accuracy prediction model corresponding to the $i^{th}$ hidden layer.

19. The apparatus according to claim 18, wherein the speech recognition accuracy is a one-dimensional value, the speech comprises T audio frames, the hidden layer information corresponding to the $i^{th}$ hidden layer is hidden layer information with a time dimension T, and the predicting the speech recognition accuracy corresponding to the $i^{th}$ hidden layer according to the hidden layer information corresponding to the $i^{th}$ hidden layer and the accuracy prediction model corresponding to the $i^{th}$ hidden layer comprises:
- inputting the hidden layer information with the time dimension T into the accuracy prediction model corresponding to the $i^{th}$ hidden layer when i is less than or equal to M, so that the accuracy prediction model corresponding to the $i^{th}$ hidden layer performs calculation on the hidden layer information with the time dimension T based on a time dimension to obtain the speech recognition accuracy, M being a positive integer less than N;
- compressing the hidden layer information with the time dimension T in the time dimension when i is greater than M, to obtain hidden layer information with a time dimension 1; and
- inputting the hidden layer information with the time dimension 1 into the accuracy prediction model corresponding to the $i^{th}$ hidden layer, to obtain the speech recognition accuracy.

20. A non-transitory computer-readable storage medium, configured to store a computer program, the computer program, when being executed by at least one processor, causing the at least one processor to perform:
- acquiring a speech;
- inputting the speech into a speech recognition model, the speech recognition model comprising an input layer, an output layer, and N hidden layers, the input layer being configured to extract an audio feature corresponding to the speech and output the audio feature to a first hidden layer, an $i^{th}$ hidden layer being configured to calculate hidden layer information corresponding to the $i^{th}$ hidden layer based on hidden layer information outputted by a previous layer, and the output layer being configured to determine a speech recognition result corresponding to the speech according to hidden layer information outputted by a hidden layer, N being a positive integer greater than 1, and i being a positive integer not greater than N−1;
- predicting speech recognition accuracy corresponding to the $i^{th}$ hidden layer according to the hidden layer information and an accuracy prediction model that are corresponding to the $i^{th}$ hidden layer, the speech recognition accuracy indicating a degree of matching between a speech recognition result determined according to the hidden layer information of the $i^{th}$ hidden layer and an accurate speech recognition result corresponding to the speech;
- outputting the hidden layer information corresponding to the $i^{th}$ hidden layer to an $(i+1)^{th}$ hidden layer in response to that the speech recognition accuracy does not meet the result output condition; and
- outputting the hidden layer information corresponding to the $i^{th}$ hidden layer to the output layer in response to that the speech recognition accuracy meets a result output condition, to obtain the speech recognition result corresponding to the speech.

* * * * *